United States Patent
Childers

(10) Patent No.: US 9,495,862 B2
(45) Date of Patent: *Nov. 15, 2016

(54) EMERGENCY RESPONSE SYSTEM AND METHOD

(71) Applicant: Jeffrey Childers, Miami, FL (US)

(72) Inventor: Jeffrey Childers, Miami, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/995,666

(22) Filed: Jan. 14, 2016

(65) Prior Publication Data

US 2016/0180698 A1    Jun. 23, 2016

Related U.S. Application Data

(63) Continuation of application No. 14/564,520, filed on Dec. 9, 2014, which is a continuation-in-part of application No. 14/217,745, filed on Mar. 18, 2014, now Pat. No. 9,257,033.

(60) Provisional application No. 61/803,973, filed on Mar. 21, 2013.

(51) Int. Cl.
| | |
|---|---|
| *G08B 3/00* | (2006.01) |
| *G08B 27/00* | (2006.01) |
| *H04N 7/18* | (2006.01) |
| *G08B 21/02* | (2006.01) |
| *G08B 25/10* | (2006.01) |
| *G08B 21/10* | (2006.01) |
| *G06T 11/60* | (2006.01) |

(52) U.S. Cl.
CPC ............. *G08B 27/001* (2013.01); *G06T 11/60* (2013.01); *G08B 21/02* (2013.01); *G08B 21/10* (2013.01); *G08B 25/10* (2013.01); *H04N 7/181* (2013.01)

(58) Field of Classification Search
CPC ....... G06F 3/14; G08B 27/001; G08B 21/02; G08B 25/00; A63B 3/00
USPC .................... 340/691.1, 691.6, 6.1, 7.59, 8.1
See application file for complete search history.

(56) References Cited

U.S. PATENT DOCUMENTS 7,154,379 B2 * 12/2006 Reed .................... G08B 27/001
                                                        340/286.05
9,257,033 B2 *  2/2016 Childers ................ G08B 25/10

* cited by examiner

*Primary Examiner* — Toan N Pham
(74) *Attorney, Agent, or Firm* — Malloy & Malloy, P.L.

(57) ABSTRACT

An improved emergency response system and method includes at least one zone display structured to present a plurality of zones that convey certain information to bystanders, dispatchers, and/or emergency responders. Each zone corresponds to a different portion of the local premises, such that the zones are collectively configured to convey at least directional information pertaining to the local premises. The zone display is further configured to present at least one universal directional indicator associated with each zone. Accordingly, the information associated with the zones and directional indicators is utilized to facilitate an emergency response. The presenting of the zones can include depicting at least a portion of the premises via mapping overlay display. Further, the zone displays can depict threat level indicators corresponding to perceived circumstances of one or more zones.

17 Claims, 20 Drawing Sheets

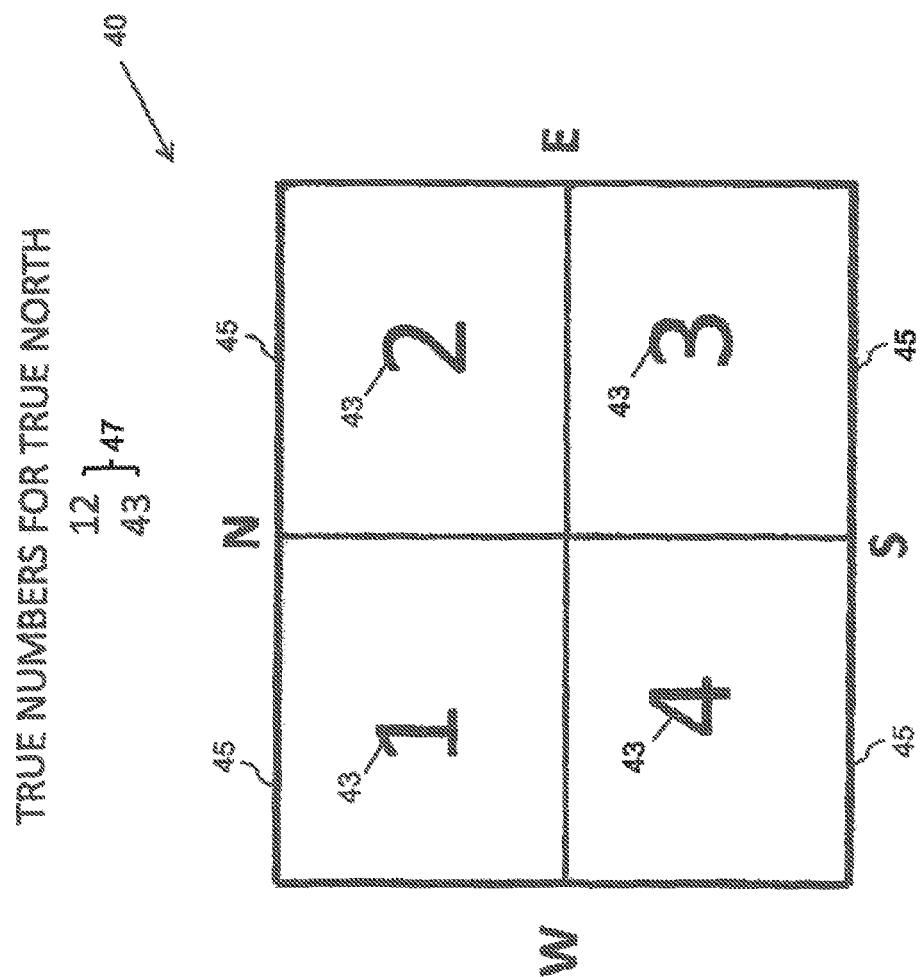

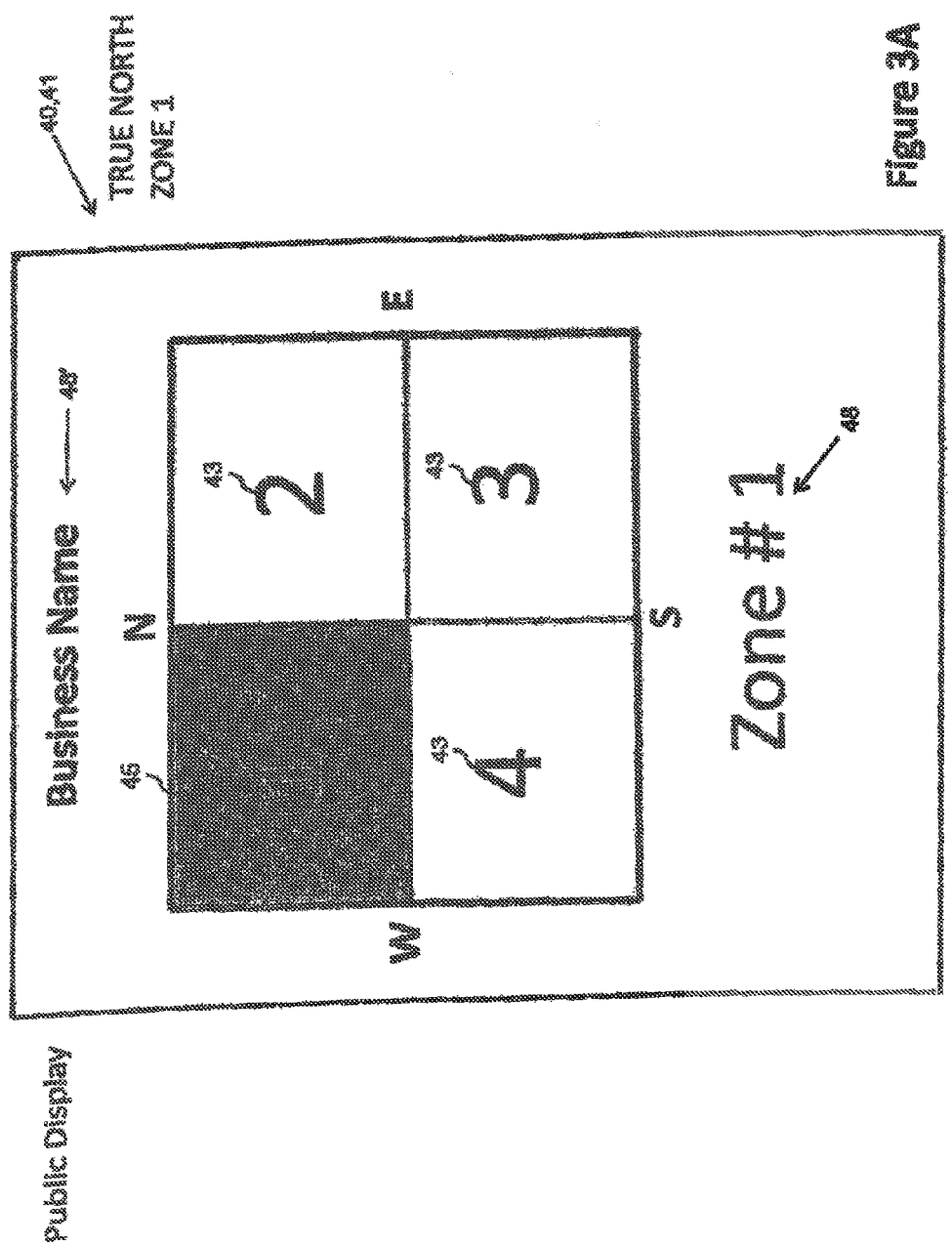

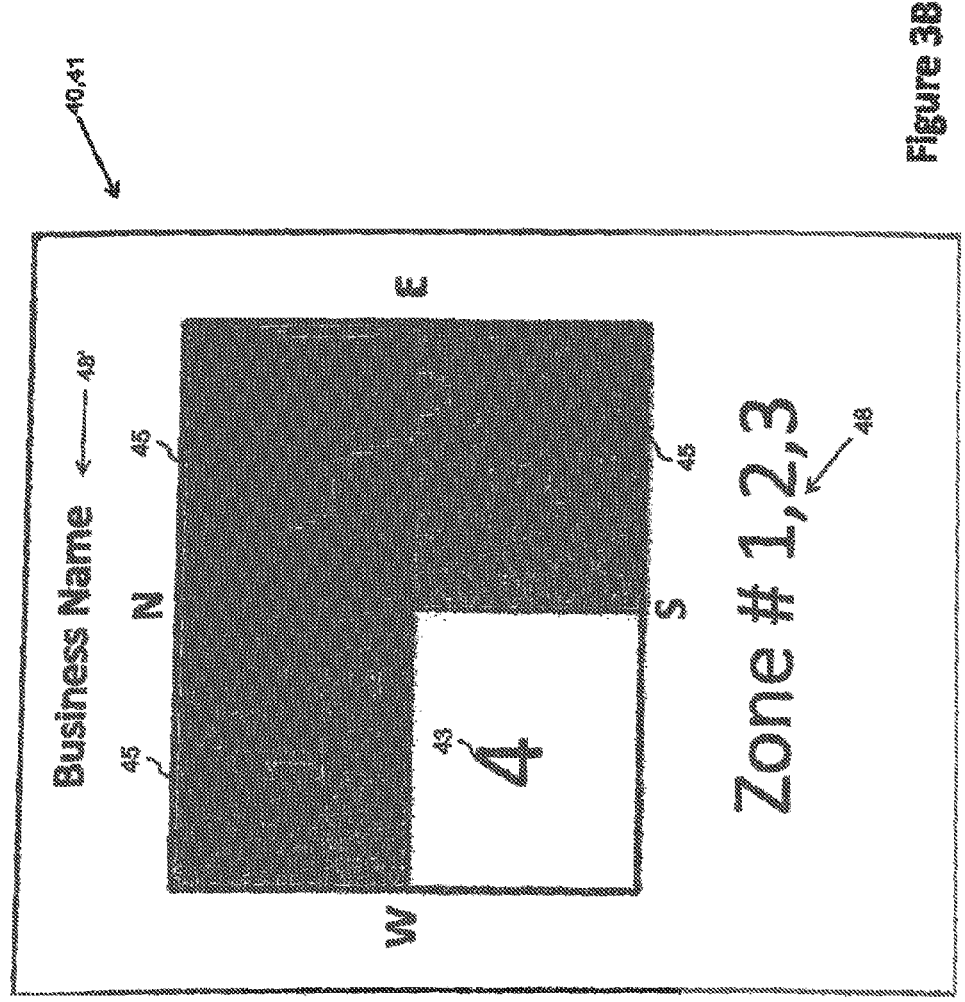

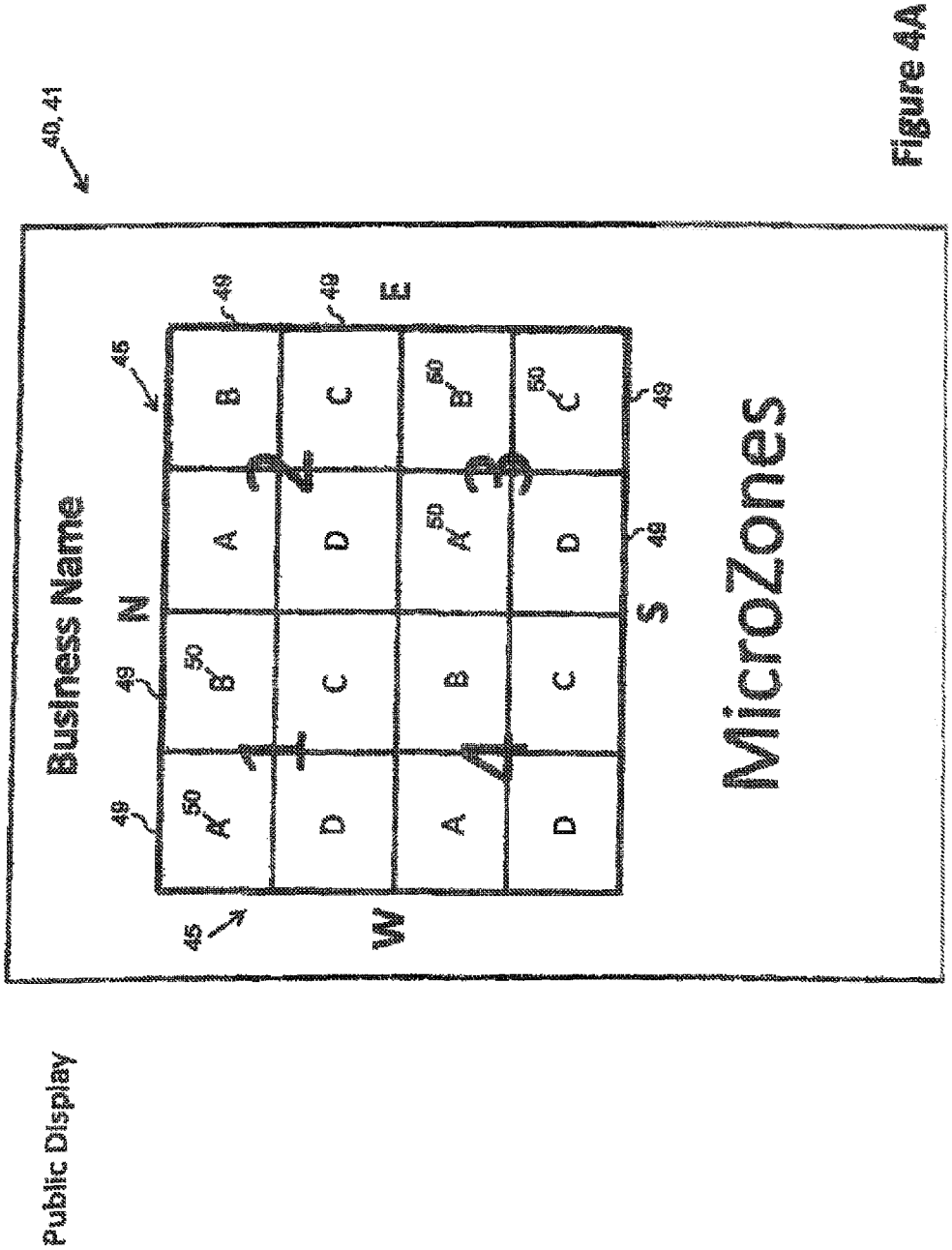

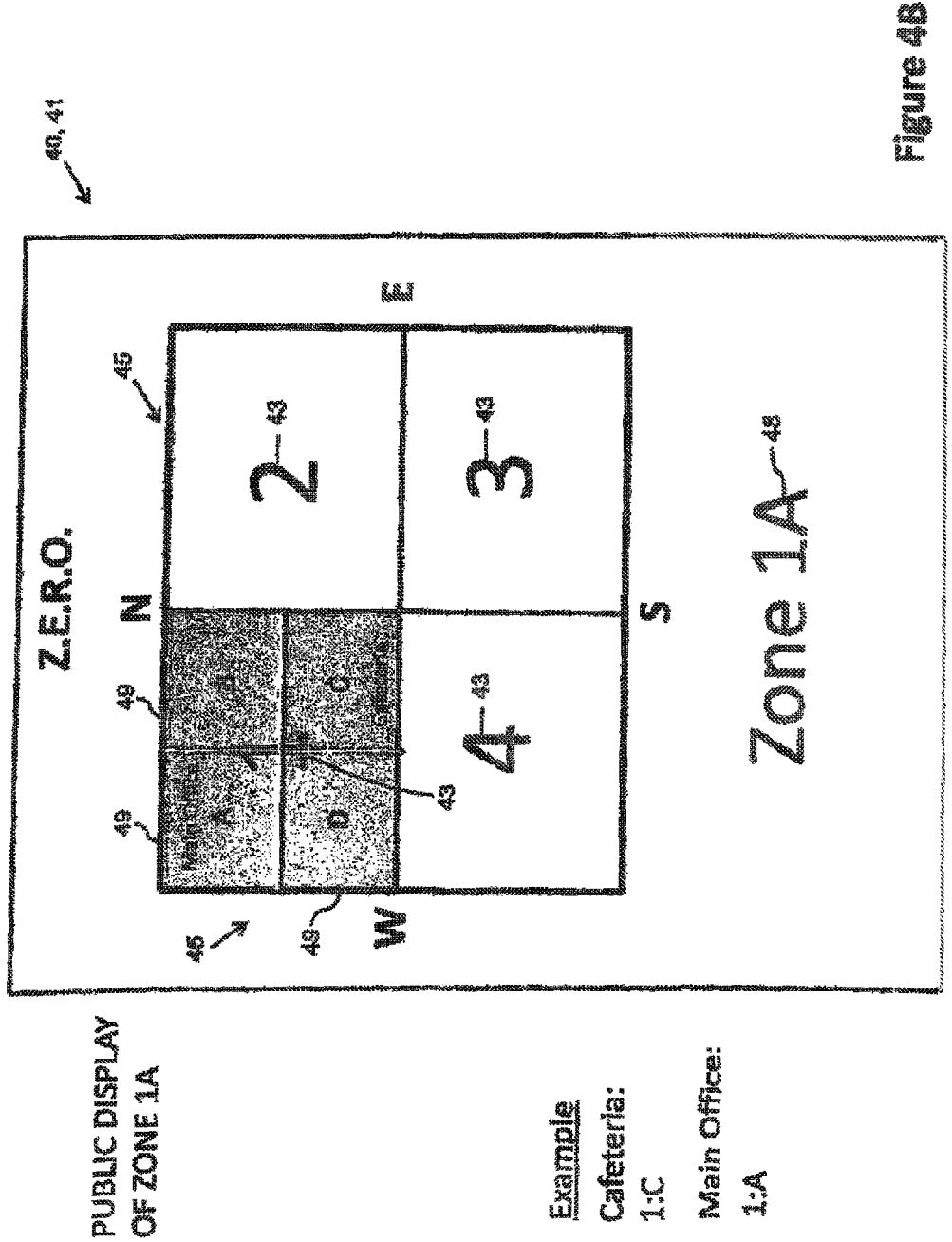

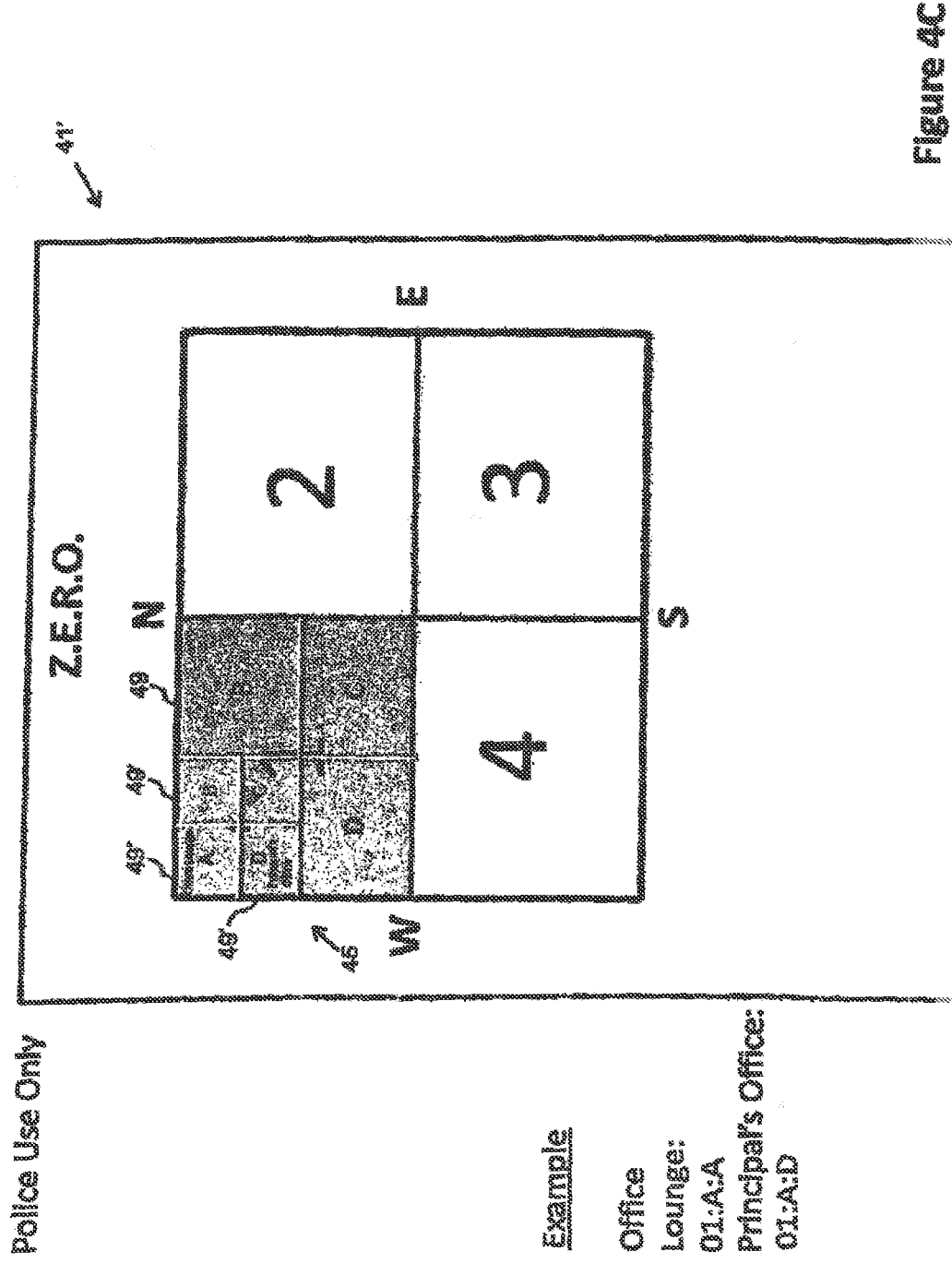

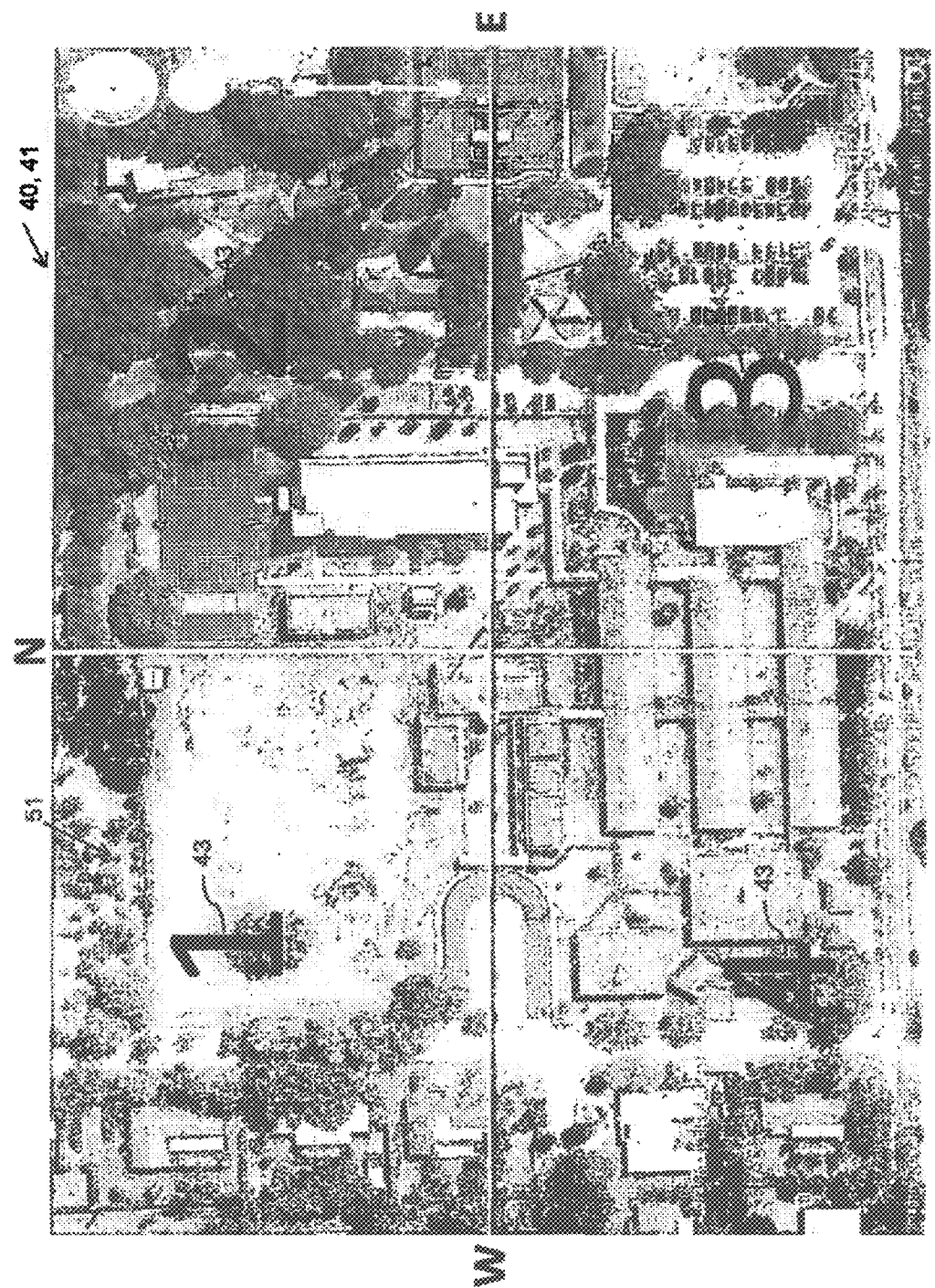

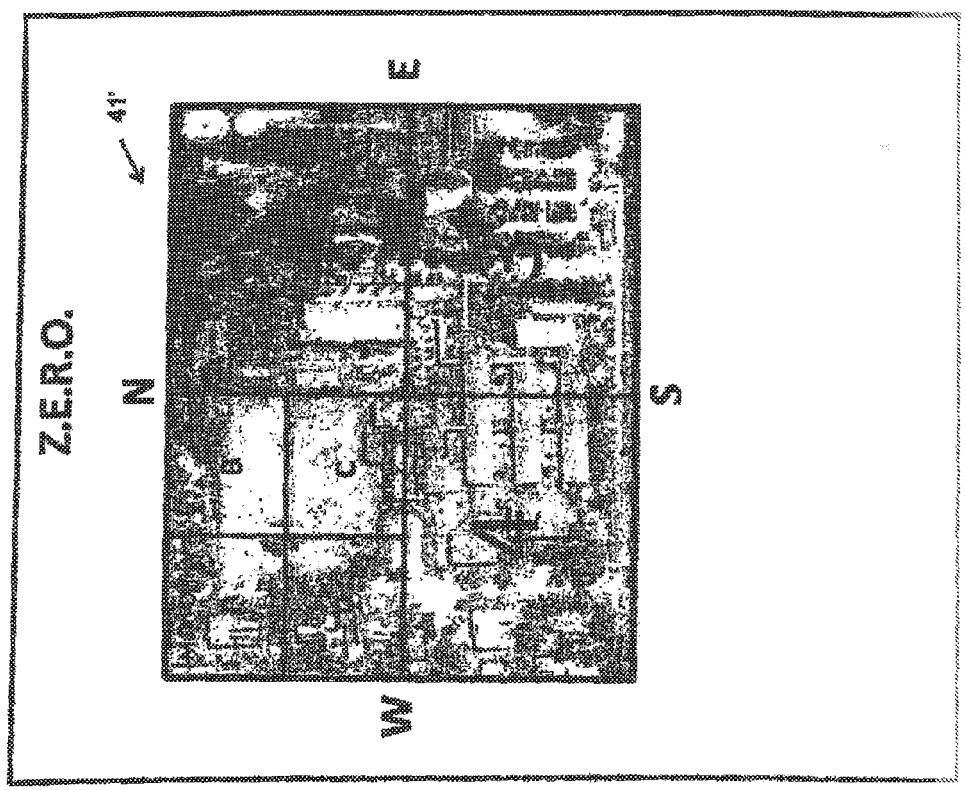

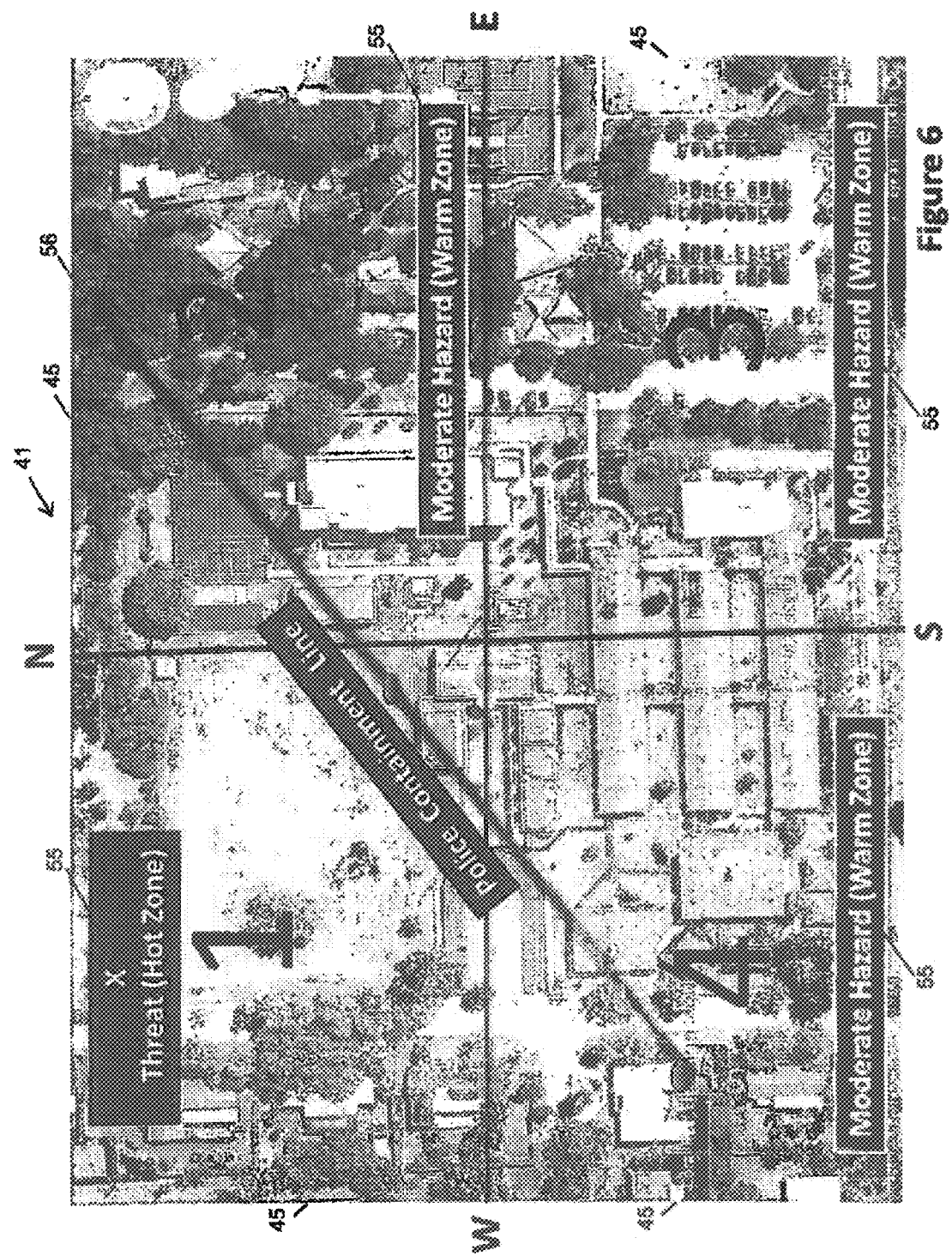

EMERGENCY RESPONSE SYSTEM AND METHOD

CLAIM OF PRIORITY

This application is also a continuation-in-part of pending U.S. application having Ser. No. 14/564,520 filed on Dec. 9, 2014, which is a continuation-in-part of U.S. application Ser. No. 14/217,745 filed on Mar. 18, 2014, which has matured into U.S. Pat. No. 9,257,033, which is a non-provisional patent application of U.S. provisional application having Ser. No. 61/803,973 and a filing date of Mar. 21, 2013. Each of the above patents and applications are incorporated in their entirety herein by reference.

BACKGROUND OF THE INVENTION

Field of the Invention

This invention is directed to an improved emergency response system and method for use in responding to emergencies at various premises such as homes, businesses, neighborhoods, campuses, etc. An emergency dispatcher, or electronic equivalent, can reference designated location zones and microzones to relay important location information regarding a target location to first responders, regardless of whether additional premises-related information is immediately available. In addition, the zones and microzones can be displayed in a superimposed manner relative to mapped features of the local premises, such as satellite photos, site maps, architectural plans, etc. The system is further capable of assigning and displaying relative threat levels to corresponding zones.

Description of the Related Art

In view of the increasing awareness of natural disasters such as floods, hurricanes, tornadoes, earthquakes, and forest fires, as well as the unfortunate occurrence of other emergency situations to include in-school violence, terrorist attacks, crimes, fires, structural failures of bridges and buildings, etc., there remains a need for improving the manner in which first responders are advised of emergency situations so that they can respond more timely and more accurately when called upon.

For instance, presently, a bystander typically will call an emergency dispatcher to identify the general location and circumstances of a particular emergency situation. In such cases, the dispatcher must rely on the caller (who is typically under duress) to accurately identify the specific local area at issue. Such conversations can be confusing, and often result in somewhat ambiguous if not erroneous information being conveyed. For instance, if a caller on a school campus says that the emergency is happening "in the classroom next to the cafeteria," such a general statement might lead to initially inaccurate dispatch information or, at the very least, result in a delayed response while appropriate identifying information is referenced and cross-checked.

Another problem arises in cases where a map or architectural plan of the target site is not immediately available, since any delays in locating the appropriate information can have severe consequences.

Still another problem of current practices involves pre-planned evacuation routes which in some cases can become deadly in view of developing circumstances, wherein what was initially thought to be a safe area becomes a hazard itself.

It would therefore be beneficial to implement an improved emergency response system and method that facilitates the conveying of more specific, immediate information about a particular location at issue. It would be a further benefit for such a technology to permit display of relevant information in a superimposed manner relative to mapped features of the local premises, such as satellite photos, site maps, architectural plans, etc., in relatively short order, if not immediately upon request. It would also be beneficial for a system implementing such features to be capable of assigning and displaying relative threat levels to on-premises areas, preferably in dynamic fashion as the situation develops.

SUMMARY OF THE INVENTION

The present invention is directed to an improved emergency response system and method for use in responding to emergencies at various premises such as homes, businesses, neighborhoods, campuses, etc. The system utilizes designated location or location zones and microzones, which are individually and/or collectively oriented with universal location indicators. An emergency dispatcher, or electronic equivalent, can reference the designated location zones and microzones to relay important location information regarding a target location to first responders, regardless of whether additional premises-related information is immediately available. In addition, the zones and microzones can be displayed in a superimposed manner relative to mapped features of the local premises, such as satellite photos, site maps, architectural plans, etc. The system is further capable of assigning and displaying relative threat levels corresponding to the respective zones.

Observers of an emergency event, such as bystanders, may utilize the system to communicate with an associated dispatch system and/or dispatcher to relay certain information about the event, including locational information. Such communication will typically be accomplished via a personal communication device, a software app on a communication device, or other competent local communication equipment, such as a telephone, computer terminal, tablet pc, other video and audio devices, etc. More in particular, as discussed further below, the bystanders will identify and communicate designated directional or location zone or microzone information associated with a particular system display. In addition, as discussed further below, first responders may have the ability to identify and communicate designated location zone information, such as emergency victim information, associated with a system display and/or a corresponding triage system display to the zone server, dispatchers, and/or dispatch system via the network.

In various physical embodiments, the system displays and triage system displays can comprise an electronic display on a personal communication device, a software app on a personal communication device or other computing/communication device, visual signage, posters, message boards, and the like, as well as indoor and/or outdoor on-premises multimedia displays. In some such embodiments, the system displays and triage system displays are appropriately displayed relative to an instant location of a correspondingly referenced mobile device. In other such embodiments, the system displays and triage system displays are fixedly positioned in strategic locations about the premises, such as in the case of posters, signs, and on-premises multimedia displays.

Access to the various features, functionality, and data associated with each zone and each microzone, which are stored by a zone server, may thus be accomplished over the network by various user interfaces (e.g., bystanders' personal communication devices, a communication device software app, on-premises communication equipment, responder interfaces, etc.) as well as via an associated surveillance system and an associated dispatch system.

In at least one embodiment, the layout of a premises is represented in a system display by four zones numbered "1" through "4". As such, in this embodiment, the relative orientation of the number displays serve as universal location indicators. For instance, when the number "2" associated with zone 2 is viewed as showing immediately to the right of the number "1" associated with zone 1, a direction of true North is indicated accordingly. The orientation of the number displays is in a clockwise orientation. As such, in this embodiment, the relative orientation of the number displays serve as universal location indicators. For instance, the number "2" associated with zone 2 is viewed as showing immediately to the right of the number "1" associated with zone 1, the number "3" associated with zone 3 is viewed as showing immediately underneath of the number "2" and number "4" associated with zone 4 is viewed as showing immediately to the left of number "3". Thus, consistent with universal location indicators, the orientation of the system display is appropriately rotated according to a particular corresponding reference location about the actual premises. The orientation of the number displays can be in various other forms, and can be referenced separately in shorthand form, in addition to the standard zone and microzone system display format.

In a further embodiment, the zones can also be associated with different color codes, which may serve to cooperatively identify at least one aspect of the universal location indicators, and potentially convey additional information relative to the other zones. For example, the status of a particular zone and microzone might be emphasized relative to the others by such use of the color codes (e.g., active/inactive status, threat/safe, accessible/non-accessible, etc.).

Additional information can be conveyed by the system displays via use of symbols, text, graphics, etc. Two such examples include a zone and microzone status summary field and a premises identifier field.

In another embodiment, using a four quadrant scheme arrangement as an example, the system display can be divided into four quadrants, such that the four quadrants each generally comprise about twenty five percent of the area of the system display and each quadrant is fixedly tied to a true direction of the corresponding premises, such that the four quadrants are disposed in a mapped clockwise orientation in relation to a particular corresponding area of the premises. For instance, a four quadrant scheme can comprise a first quadrant that represents a Northwest portion of the premises, a second quadrant that represents a Northeast portion of the premises, a third quadrant that represents a Southeast portion of the premises, and a fourth quadrant that represents a Southwest portion of the premises.

More specifically, if the layout of a premises is represented in a system display by four quadrants numbered "1" through "4", when the second quadrant associated with the Northwest portion of the premises is viewed as showing immediately to the right of the first quadrant associated with the Northeast portion of the premises, a direction of true North is indicated accordingly. The orientation of the number displays is in a clockwise orientation. As such, in this embodiment, the third quadrant associated with the Southeast portion of the premises is viewed as showing immediately underneath of the second quadrant, and the fourth quadrant associated with the Southwest portion of the premises is viewed as showing immediately to the left of the third quadrant and immediately underneath of the first quadrant. While this is not the only appropriate manner in which to organize/arrange the various quadrants, it is shown as a preferred embodiment that can be implemented in a relatively straightforward manner to carry out the objectives of the present invention.

Additional interactive multimedia features of the system include mapping overlay display features, which can be associated with the respective zone and microzone schemes. For instance, a satellite image overlay of a school campus can correspond to four designated zones ("zones 1-4"). Furthermore, as discussed in further detail below, the zones can further be divided into "microzones" which may also be arranged into corresponding quadrants, if desired. Microzones would be small breakdowns within a zone and can include, but is not limited to, certain buildings, houses, landmarks, parking structures, or any known edifice. Microzones can also be smaller zone areas within a zone, if no structures exist, or alternatively, can be combination of both structures and smaller zone areas within a designated zone. Microzones can also be designated by specific building numbers or real estate lots or vice versa. As a way of example, a designated zone "1" for instance, can comprise of microzones with designations "1A", "1B", "1C", "1D", and so on, depending on the infrastructure of the smaller zone areas within the designated zone and/or existing structures within that zone. Similarly, a designated zone "2" can comprise of microzones with designations "2A", "2B", "2C", "2D", and so on. This panoply of designations can be effectuated based on various other conditions, reasoning, and preferences that may exist in each individual local premises basis at a given time. In this way, the mapping overlay display features permit display of zone and microzone related information in a superimposed manner relative to mapped features of the local premises, such as satellite photos, street maps, site maps, architectural plans, etc. In some embodiments, this display can be dynamically adjusted, in relatively short order, if not immediately in real time (or upon request).

In another embodiment, a premises may also contain a designated triage area, such as a separate building or an adjacent open field, wherein victims of an emergency situation on the premises can be assessed by first responders and transferred based on level of injury/illness to the designated triage area in order to facilitate an emergency response. The designated triage area can be divided into quadrants based on divergent assessed triage levels represented by triage system displays. In at least one embodiment, the layout of a designated triage area of the premises is represented in a triage system display, typically utilized by first responders to interact with the system. The physical embodiment of the triage system displays can take the form of traditional hardcopy, such as signs, posters, maps, etc., as well as modern electronic displays, such as electronic billboards, computer screens, mobile communication device displays, etc. An emergency dispatcher, or electronic equivalent, can reference the designated location zones to relay important location information of assessed triage levels regarding a designated triage area of the premises to first responders, regardless of whether additional premises-related information is immediately available.

Further, first responders may have the ability to identify emergency victim information and communicate with the network, in order to relay information about the emergency. In at least some embodiments, responder interfaces are structured for receiving input from first responders to update emergency victim information to the zone server, which can be communicably connected with a dispatch system and/or dispatcher to further facilitate the interactive emergency response capabilities of the system.

Similar to a quadrant scheme of a system display wherein each quadrant is tied to a general direction of the premises, the layout of a triage system display can also be represented by quadrants, each tied to a general direction of the designated triage area of the premises. The preferred arrangement for the zones involves implementation of a quadrant scheme, wherein each triage system display is divided into four quadrants where each quadrant is generally tied to a direction of the corresponding designated triage area of the premises, such that the four zones are disposed in an orientation in relation to a particular corresponding area of the designated triage area of the premises. For instance, a four quadrant scheme can comprise a first quadrant that represents a Northwest portion of the triage area of the premises, a second quadrant that represents a Northeast portion of the triage area of the premises, etc.

Further, each of the zones can represent a particular assessed triage level. For instance, a first zone can represent "Minor Injuries," a second zone "Deceased," a third zone "Immediate Medical Attention," and a fourth zone "Delayed." In addition, the zones can be displayed in a superimposed manner relative to mapped features of the premises, such as satellite photos, site maps, architectural plans, etc.

Furthermore, triage system display can be posted as a hardcopy and updated manually, such as when a posted display is printed accordingly in real time, or selected from a stack of pre-printed displays, etc. In the case of electronic triage system displays the presentation of a particular display can simply be electronically updated in real time, via the network, as circumstances dictate. Moreover, additional information can be conveyed by the triage system displays, via use of symbols, text, graphics, etc.

In another embodiment, the system can include a surveillance system, which can be associated with the zones and microzones of the local premises. For instance, the surveillance system can include a series of cameras or other visual aid devices strategically located within the zones and microzones of the local premises. The surveillance system will enable users, first responders, law enforcement officers, dispatchers, and automated aspects of the dispatch system to have a visual kaleidoscope of events within each of the zones and microzones in real time or delayed version, helping them assess conditions. Moreover, the surveillance system would further aid in interacting with bystanders in specific zones and microzones. The surveillance system can also be linked to other multimedia features of the system such as a mapping overlay display or satellite image overlay. This would enable users, first responders, law enforcement officers, dispatchers, or automated aspects of the dispatch system to have a vantage point of the local premises. It would enable them to locate the "hot" zones or microzones efficiently, by cutting down the preliminary investigation time, and engaging appropriate action readily.

As a useful feature, the system can also include a multitude of panic buttons. The panic buttons can be accessed via bystanders' personal communication devices, software apps, on-premises communication equipment or any other known user interfaces. As a way of example, effectuating a panic button would directly alert first responders, law enforcement officers, dispatchers, personnel or automated aspects of the dispatch system of an ongoing hazard or potential danger in a designated zone or microzone of the local premises. Help would then be directed to the location where the panic button was physically pressed within the zone or microzone location or alternatively, location where it was engaged via software app of a personal communication device. The panic buttons can be designated with respect to specific zones and microzones of the local premises. The panic button designation can include, and is not limited to, numbers, letters, alphabets, patterns, colors, codes, braille, tables and other known nomenclature. The panic button designations can be tied directly to single or multitude of zone(s) and microzone(s). They can also be configured to wireless access points within each or multitude of zone(s) and microzone(s). For instance, the wireless access points will link with the panic buttons via a communication network and initiate an automated alert of a designated zone or microzone. As an additional feature, the alert can also automatically activate the camera displays of the surveillance system enabling users to have a visual of the corresponding alerted designated zone or microzone.

The system is further structured and capable of concurrently displaying both a system displays which represent a premises and triage system displays which represent a designated triage area of the same premises, where triage system displays are typically utilized by first responders to at least identify assessed triage level quadrants and may have the ability to communicate emergency victim information with the network, via responder interfaces that are communicably connected with the network.

The triage system displays can comprise an electronic display on a first responder's personal communication device or other computing/communication device, and also visual signage, posters, message boards, and the like, as well as indoor and/or outdoor on-premises multimedia displays. In some embodiments, the triage system displays are fixedly positioned in strategic locations about the designated triage area of a premises, such as in the case of posters, signs, and on-premises multimedia displays. In other embodiments, the triage system displays are electronically displayed, typically for first responders, for instance, on responder interfaces. In such embodiments, responder interfaces are structured for presenting a variety of visual, audio, and/or audiovisual content to the first responders. First responders may have access to the various features, functionality, and data associated with each zone stored by the zone server, which may be accomplished via the various responder interfaces, as well as via the dispatch system. One or more networks can connect the zone server, dispatchers, and/or dispatch system with each other and with the various responder interfaces. The responder interfaces can be structured to communicate and input emergency information to the network.

1. For instance, during an emergency situation, first responders can view system displays of premises, either in hardcopy form or electronically via responder interfaces, in order to assess which zone(s) contain the emergency situation. First responders may encounter hundreds of victims of an emergency situation at the premises, where they must assess and assign the degrees of urgency to wounds or illnesses to decide the order of treatment of a large number of victims or casualties. The premises may have a designated triage area, such as a separate building or an adjacent open field, which can be divided into quadrants based on divergent assessed triage levels represented by triage system displays.

2. For example, one designated triage area may be an open field adjacent to a stadium and divided into four quadrants based on assessed triage levels, such that a first zone can be designated "Minor Injuries," a second zone "Deceased," a third zone "Immediate Medical Attention," and a fourth zone "Delayed". First responders can view triage system displays either in hardcopy form or electronically via responder interfaces to obtain which quadrant of the triage system displays correspond with the correct assessed triage level. First responders can identify/classify or 'tag' emergency victims with a number, letter, color code etc. according to their assessed injuries, such that 'tagging' the number "1" on an victim can signify he/she has "Minor Injuries" sent to the corresponding assessed triage quadrant "1", 'tagging' the number "2" on an victim can signify he/she is "Deceased" sent to the corresponding assessed triage quadrant "2" etc.

3. In some embodiments, first responders can concurrently 'tag' emergency victims and update the information to facilitate emergency response to the network, via responder interfaces, in order to facilitate sending the appropriate amount of resources to each of the assessed triage quadrants based on the amount of victims that were 'tagged' to be sent to each triage quadrant.

In another such embodiment, all victims found in quadrant "1" of the premises can be sent to the corresponding assessed triage zone "1" of the designated triage area of the premises regardless of injuries sustained; all victims found in quadrant "2" sent to the corresponding assessed triage zone "2" of the premises etc.

Another useful feature of the system is the use of threat level indicators corresponding to respective zones and microzones. The users, such as first responders, dispatchers, or automated aspects of the dispatch system can evaluate pertinent conditions and appropriately determine a corresponding threat level associated with a given zone and a related microzone. Once a threat level is determined, the threat level can be displayed via the corresponding threat level indicator. By way of example, threat level indicators can assume the relative presentations of a heat index, such that "warm zones" are identified with moderate hazards, "hot zones" are identified with imminent threats, etc. Furthermore, a threat containment line can also be calculated and displayed based on pertinent conditions. In one such example, the threat containment line is displayed in a manner that separates the "hot zone" areas from the "warm zone" areas. Further still, the system is capable of assigning and displaying relative threat level indicators in dynamic fashion as the situation develops, such as in real time. Likewise, the system is capable of adjusting the position and other parameters of the threat containment line in real time, as circumstances dictate.

These and other objects, features and advantages of the present invention will become clearer when the drawings as well as the detailed description are taken into consideration.

BRIEF DESCRIPTION OF THE DRAWINGS

For a fuller understanding of the nature of the present invention, reference should be had to the following detailed description taken in connection with the accompanying drawings in which:

FIGS. 2A-2D are schematic representations of structural and operative features of a zone and microzone scheme utilized by end users to interact with the system of FIG. 1A.

FIG. 3A-3B are schematic representations of system displays associated with the zone and microzone scheme of FIGS. 2A-2B.

FIG. 4A is a schematic representation of structural and operative features of another zone and microzone scheme utilized by end users to interact with the system of FIG. 1.

FIGS. 4B-4C are schematic representations of system displays associated with the zone scheme of FIG. 4A.

FIGS. 5A-5B depict examples of satellite mapping overlay display features associated with the respective zone and microzone schemes.

FIG. 6 depicts an example of threat level indicators corresponding to respective zones and microzones, together with satellite mapping overlay features.

Like reference numerals refer to like parts throughout the several views of the drawings.

DETAILED DESCRIPTION OF THE PREFERRED EMBODIMENT

Figure 1:
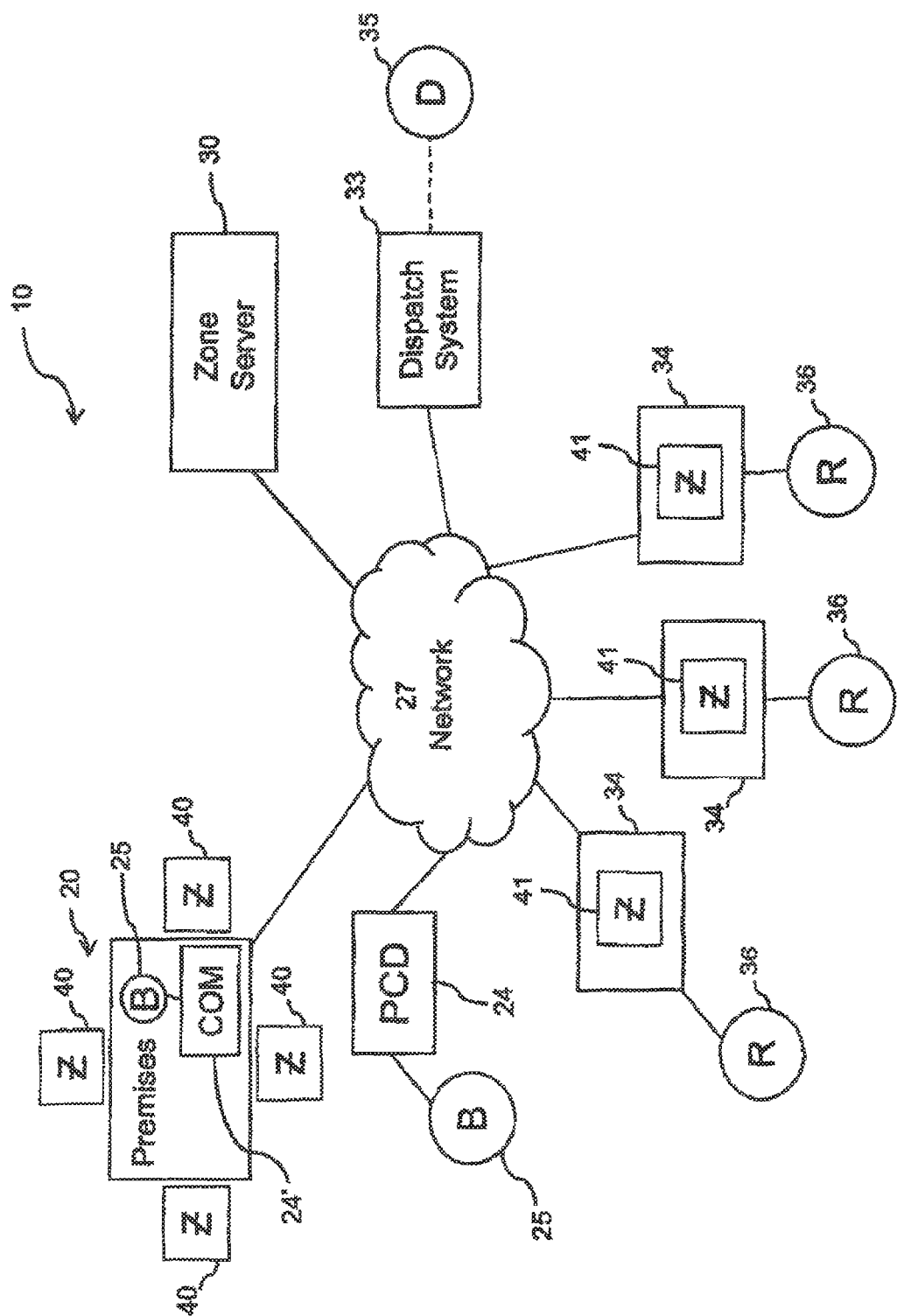
FIG. 1 is a schematic view in blocked diagram form of the various operative and structural features of the system of the present invention.
Figure 1A:
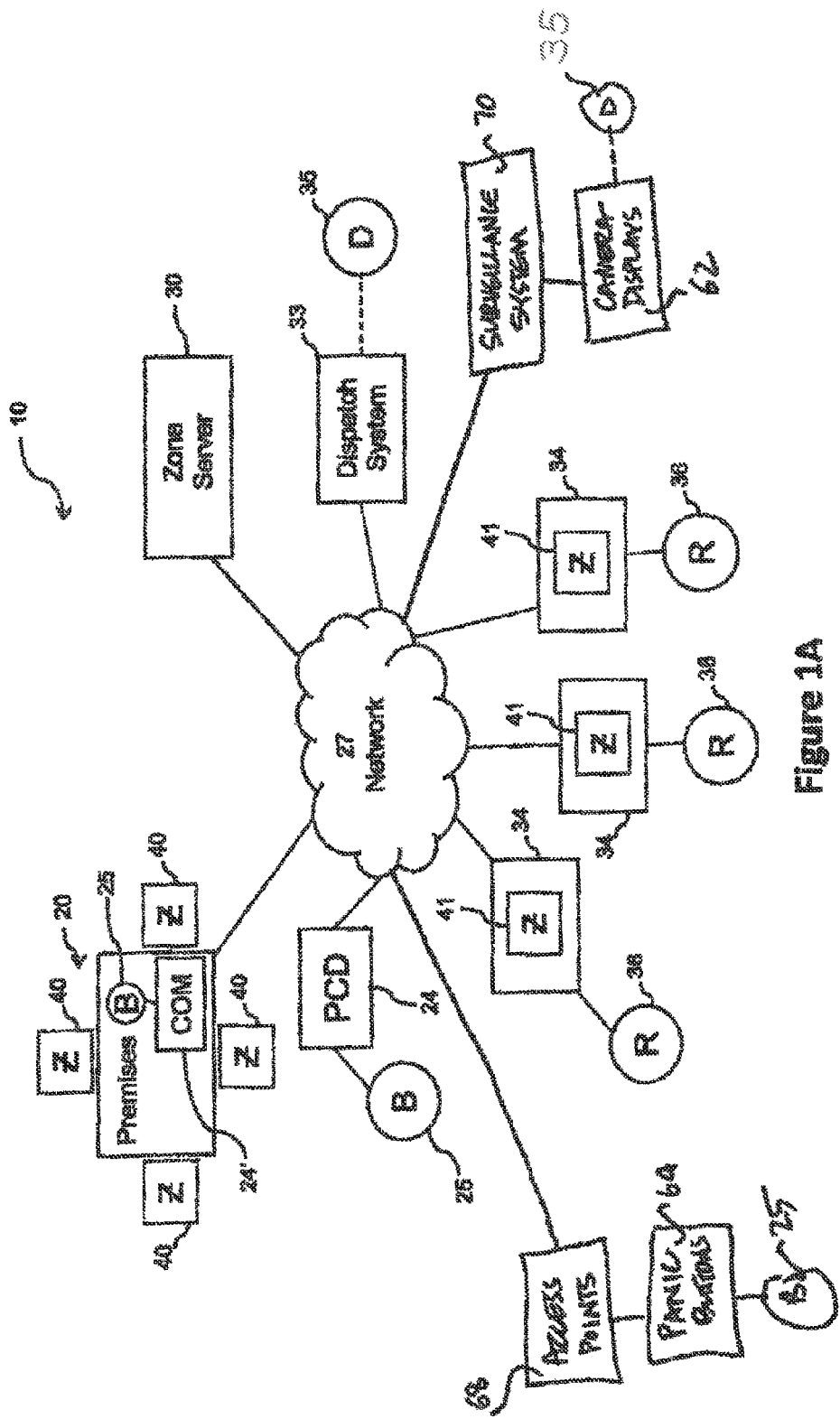
FIG. 1A is a schematic view in blocked diagram for of the various operative and structural features of the system of the present invention in another embodiment.
Figure 1C:
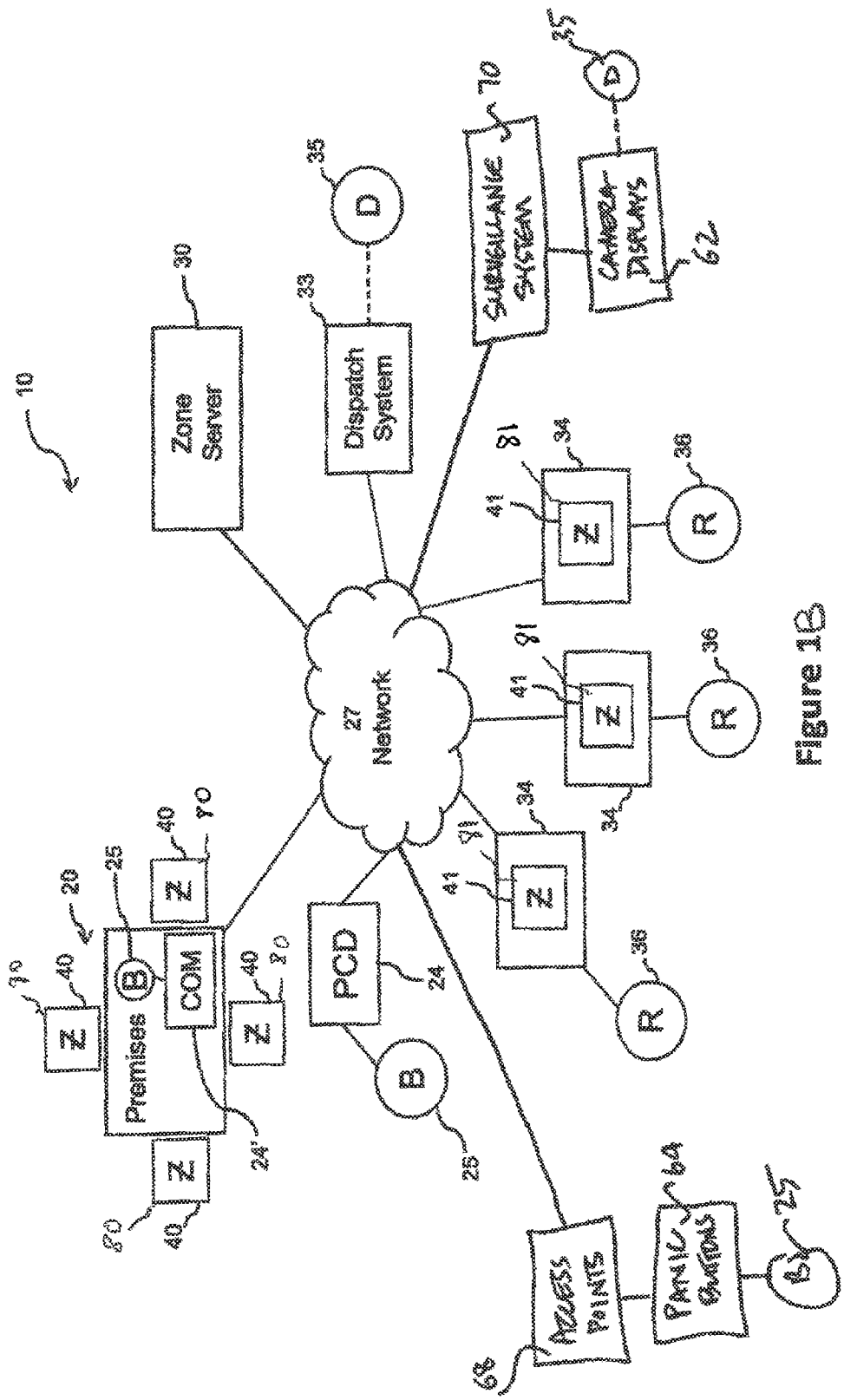
FIG. 1B is a schematic view in blocked diagram form of the various operative and structural features of the system of the present invention in another embodiment.

As represented in the accompanying Figures, the present invention is directed to an improved emergency response system 10 and method 100 for use in responding to emergencies at various premises 20 such as homes, businesses, neighborhoods, campuses, etc. The system 10 utilizes designated location zones 45, which are individually and/or collectively oriented with universal location indicators 47. An emergency dispatcher 35, or electronic equivalent, can reference the designated location zones 45 to relay important directional or location information regarding a target location to first responders 36, regardless of whether additional premises-related information is immediately available. In addition, the zones 45 and the microzones 49 can be displayed in a superimposed manner relative to mapped features of the local premises, such as satellite photos, site maps, architectural plans, etc. The system 10 is further capable of assigning and displaying relative threat levels 60 corresponding to the respective zones 45 and microzones 49.

While many of the examples of the present disclosure specifically pertain to school campus scenarios, the scope and intent of the present invention also applies to a wide variety of other types of premises, including but not limited to office buildings, college campuses, hospitals, entertainment venues, town squares, government facilities, laboratories, manufacturing plants, distribution centers, storage and logistical facilities, utility plants, designated triage areas, etc. In any case, the improved emergency response system 10 and method 100 facilitate the conveying of more specific, immediate information about a particular location 20 at issue.

Referring now to the accompanying drawings, FIG. 1 depicts one preferred embodiment of a system in accordance with the present invention, generally indicated as 10. The system 10 may assume a variety of physical and logical configurations, including a variety of computing processors/devices under a number of different operating systems and network configurations.

The inventive system 10 and method 100 comprises hardware and software run on one or more computer processors such as personal computers, smart phones, apps, servers and/or other type of machines, preferably linked together through means including, but not limited to any number of the following: phone lines, high speed cable, wireless technology, etc. The aforementioned hardware and software of the present invention can thus be utilized by remote users over a network, such as the Internet. Furthermore, certain aspects of the present invention can comprise more traditional technologies such as visual signage, posters, message boards, and the like, as well as more modern electronic display technology including, but not limited to, indoor and/or outdoor on-premises multimedia displays.

As depicted in FIG. 1, the local premises 20 will be the subject of a particular scenario, such as an emergency or other event which requires an emergency response. As such, certain observers of the event, represented as bystanders 25 ("B") in FIG. 1 will have the ability to communicate with a dispatch system 33 and/or dispatcher 35 to relay information about the event, including locational information. As illustrated, such communication will typically be accomplished via personal communication device 24 ("PCD"), wireless module ("WM") 24" or other competent local communication equipment 24' ("COM"), such as a telephone, computer terminal, tablet pc, etc., over a communication network 27. More in particular, as discussed further below, the bystander 25 will at a minimum identify and communicate designated location zone 45 or microzone 49 information associated with a system display 40,41 ("Z").

In addition, as depicted in FIG. 1B, certain responders to the emergency or other event, represented as first responders 36 ("R") in FIG. 1B may have the ability to communicate with a dispatch system 33 and/or dispatcher 35 to relay emergency information about the event, including emergency victim information. As illustrated, such communication will typically be accomplished via personal responder interface 34, for instance, such as a telephone, computer terminal, tablet pc, etc., over a communication network 27. More specifically, as discussed further below, first responders 36 may have the ability to identify and communicate designated location zone 45 information, such as emergency victim information, associated with a system display 40,41 and/or corresponding triage system display 80,81 to zone server 30, dispatchers 35, and/or dispatch system 35, via network 27.

In various embodiments, the system displays 40,41 and/or the triage system displays 80,81 can comprise an electronic display on a personal communication device or other computing/communication device, visual signage, posters, message boards, and the like, as well as indoor and/or outdoor on-premises multimedia displays. In some such embodiments, the system displays 40,41 and/or the triage system displays 80,81 are appropriately displayed relative to an instant location of a correspondingly referenced mobile device 24. In other such embodiments, the system displays 40,41 and/or the triage system displays 80, 81 are fixedly positioned in strategic locations about the premises 20, such as in the case of posters, signs, and on-premises multimedia displays. It is also within the scope and intent of the present invention that other suitable technologies capable of visual and/or audiovisual display can also be utilized to implement the system displays 40, 41 and the triage system displays 80, 81.

As depicted in FIG. 1B, in some embodiments, the system 10 is further capable of electronically displaying the system displays 40, 41 of premises 20 and the triage system displays 80, 81 of the designated triage area of the same premises 20 concurrently, via responder interfaces 34. For instance, using a hospital and its designated triage area as the premises 20, first responders 36 can view, via responder interfaces 34 communicably connected to system 10, the system display 40,41 of hospital 20, as well as a triage system display 80,81 of the designated triage area of the same hospital 20. In other embodiments, first responders 36 can electronically identify and communicate emergency victim information to the system 10, as discussed further below.

In at least one embodiment, a zone server 30 preferably includes at least one computer processor and is structured to have sufficient processing and/or storing capabilities to manage the administration of relevant aspects of the system 10 in the intended manner, including, but not limited to, the storage, processing, and manipulation of user input and account information, such as various device data, settings, premises data, user IDs, site specific information, and a variety of zone-related data including maps, plans, threat level status, etc. The zone server 30 can also be communicably connected with a dispatch system 33 to further facilitate the interactive emergency response capabilities of the system 10. The zone server 30 is also communicably connectable to the various personal communication devices 24, on-premises communication equipment 24', and responder interfaces 34 (discussed in more detail, below). As shown, the zone server 30 comprises a single location, however, it is within the scope and intent of the present invention that the zone server 30 can comprise multiple locations, as can the various components thereof.

As noted, the system 10 comprises a dispatch system 33 of the kind typically utilized by dispatchers 35 to communicate with bystanders 25 and responders 36. For instance, dispatch systems 33 will typically comprise communication and computing features such as voice, data, email, and other multimedia processing and communication features, and can also comprise similar database functionality to those of the zone server 30, mentioned above. By way of example, the dispatch system 33 can comprise one or more servers as well as one or more databases. Accordingly, the dispatch system 33 is communicably connected to the plurality of user interfaces (e.g., personal communication devices 24, on-premises communication equipment 24', and responder interfaces 34 via the network 27 such that each of the user interfaces may remotely and concurrently communicate with the dispatch system 33.

As further noted, the system 10 also comprises a surveillance system 70 typically utilized by dispatchers 35 to communicate with bystanders 25 and responders 36. For instance, the surveillance system 70 is structured and disposed to present at least location information pertaining to the local premises. The surveillance system 70 comprises a plurality of camera displays 62 structured and disposed to present designated location zones 45 and microzones 49, 49' related location and directional information within the local premises. The camera displays 62 have designations that include numbers, alphabets, symbols, patterns, graphics, text, and color codes. Accordingly, the surveillance system 70 is connected to at least one user interface (e.g., personal communication devices 24, on-premises communication equipment 24', and responder interfaces 34 and a wireless communication module 72 via communication network 27 and structured to facilitate emergency response communication between users.

Furthermore, the system 10 has a plurality of panic buttons 64, which are structured to have a remote access via personal communication devices 24. The panic buttons 64 are structured to be located within the designated location zones 45 and microzones 49, 49'. The panic buttons 64 are also configured to wireless access points 68 within each or multitude of zone(s) 45 and microzone(s) 49,49'. For instance, the wireless access points 68 will link with the panic buttons 64 via a communication network 27 and initiate an automated alert of a designated zone 45 or microzone 49, 49'.

Access to the various features, functionality, and data associated with each zone 45, which are stored by the zone server 30, may thus be accomplished via the various user interfaces 24, 24', 34 as well as via the dispatch system 33. In at least one embodiment, access to, and communication with, the zone server 30, by the various user interfaces 24, 24', 34 and/or dispatch systems 33 is further facilitated by an associated website. In such an embodiment, the user interfaces 24, 24', 34 and/or dispatch system 33 can each utilize a web browser to access and communicate with the zone server 30 via the website. In at least one additional embodiment, access to, and communication with, the zone server 30 is further facilitated by an associated mobile application. In such an embodiment, the user interfaces 24, 24', 34 can comprise wireless network devices capable of running the mobile application to access and communicate with the zone server 30. In a still further embodiment, access to, and communication with, the dispatch system 33 is also facilitated by an associated mobile application executed by the user interfaces 24, 24', 34.

As indicated above, one or more networks 27 connect the zone server 30 and/or dispatch system 33 with each other and with the various user interfaces 24, 24', 34. The network 27 preferably comprises the Internet, although in other embodiments, the network 27 can also comprise a service provider private network, virtual private network, local area network, ad hoc network, or other type of network. The user interfaces 24, 24', 34 can accordingly be structured to communicate with the network 27 under various protocols and wired or wireless technologies, such as, but not limited to, the Internet, cellular, satellite, WIFI, WIMAX, WLAN, WAN, LAN, WIFI hotspot, Intranet, ZIGBEE, BLUETOOTH, etc.

With continued reference to FIG. 1, and as indicated above, the system 10 includes at least one but more practically a plurality of responder interfaces 34, utilized by the emergency responders or other appropriate personnel 36 involved in facilitating the response to a given situation. The responder interfaces 34 each preferably comprise at least one computer processor and a communication capability. By way of example, the responder interfaces 34 can comprise a cell phone, a personal computer, a laptop or notebook computer, a personal digital assistant, smart phone, tablet, wearable electronic device, or other handheld device, any of which may include associated accessories such as microphones, speakers, headphones, visual displays, keypads, etc. Accordingly, the responder interfaces 34 are each communicably connected to the network 27, as depicted in FIG. 1.

In at least some embodiments, the responder interfaces 34 are structured for presenting a variety of visual, audio, and/or audiovisual content to the responders 36, and for receiving similar input from the responders 36 and/or the responders' environment. As used herein, the verb "to present" (i.e., "present," "presenting," "presented," etc.) means to display, sound, play, and/or otherwise reproduce visual, audio, and/or audiovisual content, such as, but not limited to, text, pictures, graphics, video, music, sounds, voice, vibrations, etc. It is thus within the scope and intent of the present invention that the visual presentation of the interactive content can be accomplished via one or more display components of the user interfaces 24, 24', 34; whereas any audio presentation of audio content can be accomplished via one or more speakers or other suitable components associated with the user interfaces 24, 24', 34.

As noted above, as depicted in FIG. 1B, the system 10 is further capable of concurrently displaying both system displays 40, 41 of a premises 20 and triage system displays 80, 81 of the designated triage area of same premises 20, wherein triage system displays 80, 81 are typically utilized by first responders 36 to at least identify assessed triage level zones of the triage system displays 80, 81. In some embodiments first responders 36 can identify and communicate emergency victim information with zone server 30, dispatchers 35, and/or the dispatch system 33, via responder interfaces 34 which are communicably connected to network 27. More specifically, certain personnel of an emergency situation involved in facilitating the response to a given situation, represented as emergency responders or other appropriate personnel 36 ("R") in FIG. 1B, in some embodiments have the ability to electronically identify and communicate emergency victim information and input that information to network 27 in order to relay emergency information to facilitate an emergency response.

The triage system display 80, 81 can have designations that include numbers, letters, symbols, patterns, graphics, text, or color codes. Accordingly, the triage system display 80, 81 can be connected to at least one responder interface 34, via communication network 27, and structured to facilitate emergency response communication information between first responders 36 and zone server 30, dispatchers 35, and/or dispatch system 33.

The triage system displays 80,81 can comprise an electronic display on a first responder's 36 personal communication device or other computing/communication device, and/or also visual signage, posters, message boards, and the like, as well as indoor and/or outdoor on-premises multimedia displays. In some embodiments, the triage system displays 80, 81 are fixedly positioned in strategic locations about the designated triage area of a premises 20, such as in the case of posters, signs, and on-premises multimedia displays. In other embodiments, the triage system displays 80, 81 are electronically displayed, typically for first responders, on responder interfaces 34 communicably connected to the system 10. In such embodiments, responder interfaces 34 are structured for presenting a variety of visual, audio, and/or audiovisual content to the first responders 36. First responders 36 may have access to the various features, functionality, and data associated with each zone 45, stored by the zone server 30, which may be accomplished via the various responder interfaces 34, as well as via the dispatch system 33. As indicated above, one or more networks 27 connect the zone server 30, dispatchers 35, and/or dispatch system 33 with each other and with the various responder interfaces 34. The responder interfaces 34 can be structured to communicate and allow input of emergency information to the zone server 30, dispatchers 35, and/or dispatch system 33, via network 27.

As noted above, the system 10 includes at least one but more practically a plurality of responder interfaces 34, utilized by the emergency responders or other appropriate personnel 36 involved in facilitating the response to a given situation. The responder interfaces 34 each preferably comprise at least one computer processor and a communication capability. By way of example, the responder interfaces 34 can comprise a cell phone, a personal computer, a laptop or notebook computer, a personal digital assistant, smart phone, tablet, wearable electronic device, or other handheld device, any of which may include associated accessories such as microphones, speakers, headphones, visual displays, keypads, etc. Accordingly, the responder interfaces 34 are each communicably connected to the network 27, as depicted in FIG. 1B.

Responder interfaces 34 can be structured to communicate emergency information with the zone server 30, dispatchers 35, and/or dispatch system 33, via network 27, to further facilitate the interactive emergency response capabilities of the system 10. More specifically, in at least some embodiments, responder interfaces 34 are structured to receive input from first responders 36 regarding the emergency victim information. The dispatch system 33 is communicably connected to the plurality of responder interfaces 34, via the network 27, such that each of responder interfaces 34 may remotely and concurrently communicate emergency victim information with the zone server 30, dispatch system 33, and/or dispatcher 35 in order to facilitate sending the appropriate amount of resources to each of the assessed triage zones of the triage system display 80, 81, as discussed below.

4. For instance, during an emergency situation, first responders 36 can view system displays 40, 41 of a premises 20, either in hardcopy form or electronically via responder interfaces 34 communicably connected to the system 10, in order to assess which area(s) contain the emergency situation. First responders 36 may encounter hundreds of victims of an emergency situation at the premises 20, where first responders 36 must assess and assign the degrees of urgency to victim's wounds or illnesses to decide the order of treatment of a large number of victims or casualties. The premises 20 may have a designated triage area, such as a separate building or an adjacent open field, which can be divided into quadrants based on assessed triage levels represented by triage system displays 80, 81.

5. For example, a designated triage area may be an open field adjacent to a stadium divided into four quadrants based on assessed triage levels, such that a first zone can be designated "Minor Injuries," a second zone designated "Deceased," a third zone designated "Immediate Medical Attention," and a fourth zone designated "Delayed". First responders 36 can view triage system displays 80, 81 either in hardcopy form or electronically via responder interfaces 34 to obtain which quadrant of the triage system displays 80, 81 corresponds with the correct assessed health of the victim. More specifically, first responders 36 can identify/classify or 'tag' emergency victims with a number, letter, color code etc. according to their injuries, such that 'tagging' the number "1" on an emergency victim can signify he/she has "Minor Injuries" and should be sent to the premises' corresponding assessed triage zone "1", 'tagging' the number "2" on an emergency victim can signify he/she is "Deceased" and should be sent to the corresponding assessed triage zone "2", 'tagging' the number "3" on an emergency victim can signify he/she needs "Immediate Medical Attention" and should be sent to the corresponding assessed triage zone "3", and 'tagging' the number "4" on an emergency victim can signify he/she needs "Delayed Attention" and should be sent to the corresponding assessed triage zone "4".

6. In some embodiments, first responders 36 can concurrently identify/classify or 'tag' emergency victims and update the emergency information to zone server 30, dispatch system 33, and/or dispatchers 35, via responder interfaces 34 communicably connected to network 27, in order to facilitate sending the appropriate amount of resources to each of the assessed triage zones based on the amount of victims that were 'tagged' to be sent to the corresponding triage zones.

In another embodiment, using a four quadrant scheme of the premises 20 as an example, all emergency victims found in quadrant "1" of the premises 20 can be sent to the corresponding assessed triage zone "1" of the designated triage area of the premises 20 regardless of injuries sustained; all victims found in quadrant "2" sent to the corresponding assessed triage zone "2"; all victims found in quadrant "3" sent to the corresponding assessed triage zone "3"; and all victims found in quadrant "4" sent to the corresponding assessed triage zone "4".

Turning now to FIG. 2A, a schematic illustration of a zone scheme utilized by end users to interact with the system 10 of FIG. 1 is depicted. As noted above, the physical embodiment of the system displays 40, 41 can take the form of traditional hardcopy, such as signs, posters, maps, etc., as well as modern electronic displays, such as electronic billboards, computer screens, mobile communication device displays, etc. The system 10 utilizes designated location zones 45, which are individually and/or collectively oriented with universal location indicators 47. An emergency dispatcher 35, or electronic equivalent, can reference the designated location zones 45 to relay important directional or location information regarding a target location 20 to first responders 36, regardless of whether additional premises-related information is immediately available.

Figure 2B:
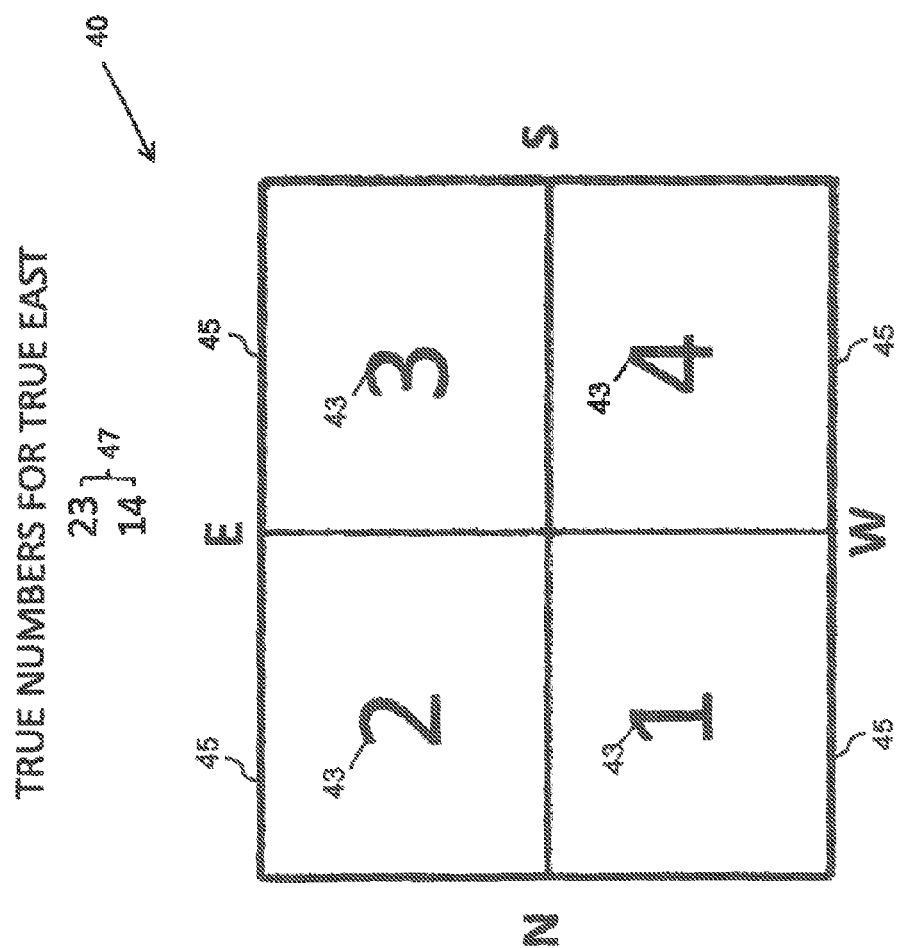

In the embodiment of FIG. 2A, the layout of a premises 20 is represented by four zones 45 numbered "1" through "4" as displayed in connection with the number displays 43. As such, in this embodiment, the relative orientation of the number displays 43 serve as universal location indicators 47. For instance, when the number "2" associated with zone 2 is viewed as showing immediately to the right of the number "1" associated with zone 1, a direction of true North is indicated accordingly. Likewise, as seen in FIG. 2B, when the number "3" associated with zone 3 is viewed as showing immediately to the right of the number "2" associated with zone 2, a direction of true East is indicated. Thus, consistent with universal location indicators 47, the orientation of the system display 40, 41 is appropriately rotated according to a particular corresponding reference location about the actual premises 20. For instance, when displayed in the form of physical signage 40, an observer facing the Western entrance area of a premises 20 might see a system display 40, 41 depicted in the manner of FIG. 2B (as he/she will be facing East). Similarly, when displayed via a mobile device screen, a user who has entered the premises might view a system display 40, 41 shown in the manner of FIG. 2A, as they move northward towards a corresponding intended direction or zone 45. By way of further example, in such an embodiment, additional screen displays may be utilized in a complimentary manner, such as compass points, position prompts, directional pointers, etc.

Furthermore, as seen in FIGS. 2A-2B, one preferred arrangement for the zones 45 involves implementation of a quadrant scheme, wherein each system display 40,41 is divided into four quadrants such that four primary zones 45 each generally comprise about twenty five percent of the area of the system display 40,41. As discussed in further detail below, with primary reference to FIGS. 4A-4C, the quadrants can further be divided into "microzones" 49, 49', also into corresponding quadrants, if desired.

In another embodiment, using the above four quadrant scheme arrangement as an example, wherein system display 40,41 is divided into four quadrants such that four primary zones 45 each generally comprise about twenty five percent of the area of the system display 40,41 and each quadrant is fixedly tied to a true direction of the corresponding premises 20, such that the four primary zones 45 are disposed in a mapped clockwise orientation in relation to a particular corresponding area of the premises 20. For instance, a four quadrant scheme can comprise a first quadrant that represents a Northwest portion of the premises 20, a second quadrant that represents a Northeast portion of the premises 20, a third quadrant that represents a Southeast portion of the premises 20, and a fourth quadrant that represents a Southwest portion of the premises 20.

Further, when the layout of a premises 20 is represented in a system display 40, 41 by four zones 45 numbered "1" through "4", when the second quadrant associated with the Northwest portion of the premises 20 is viewed as showing immediately to the right of the first quadrant associated with the Northeast portion of the premises 20, a direction of true North is indicated accordingly. The orientation of the number displays 43 is in a clockwise orientation. As such, in this embodiment, the third quadrant associated with the Southeast portion of the premises 20 is viewed as showing immediately underneath of the second quadrant, and the fourth quadrant associated with the Southwest portion of the premises 20 is viewed as showing immediately to the left of the third quadrant and immediately underneath of the first quadrant. While this is not the only appropriate manner in which to organize/arrange the various zones 45, it is shown as an embodiment that can be implemented in a relatively straightforward manner to carry out the objectives of the present invention.

Figure 2C:
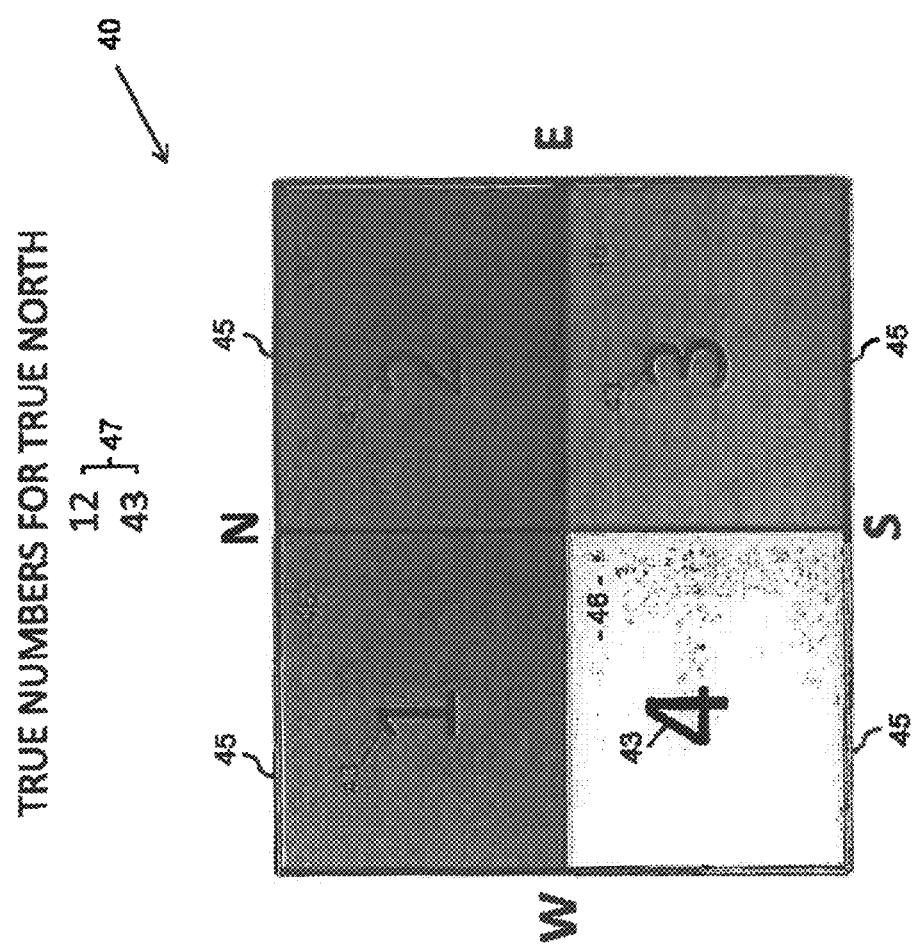
Figure 2D:
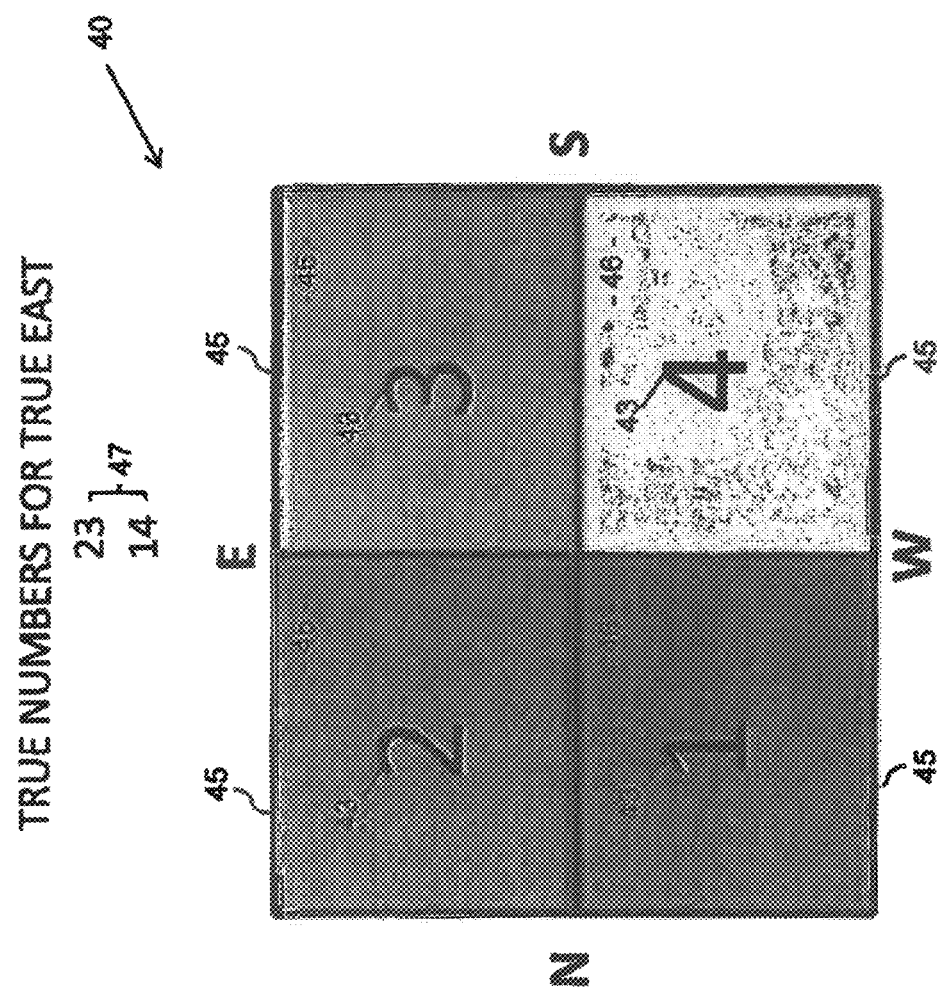

With reference to FIGS. 2C-2D, the zones 45 can further be associated with different color codes 46. The color codes 46 serve to differentiate the zones and, further, may serve to cooperatively identify at least one aspect of the universal location indicators 47. For example, in this embodiment, when the color associated with zone 2 is viewed as showing immediately to the right of the color associated with zone 1, a direction of true north is indicated accordingly. As one example, zone 1 might be color coded green, zone 2 blue, zone 3 orange, and zone 4 yellow. As such, in this embodiment, the relative orientation of the number displays 43 and the relative orientation of the color codes 46, both respectively and collectively, serve as universal location indicators 47.

In accordance with the above examples, it is contemplated that in at least some embodiments, the zone scheme can be systematically implemented in such a manner that even a child will be able to relay critical emergency information to a dispatcher 35 or other responder 36. By way of example, only, the below dialogue provides a basic remote telephone call scenario in the setting of an elementary school emergency, in which referencing the zones 45 can facilitate an emergency response:

Caller 25:
"Help! There is a fire at the school!"
Dispatcher 35:
"Where is the fire located?"
Caller 25:
"In Ms. Childers' classroom."
Dispatcher 35:
"What zone is Ms. Childers' classroom in?"
Caller 25:
"Zone 1." (phone disconnects . . . )
Dispatcher 35:
"Attention all units, fire at Coral Reef Elementary School. Multiple calls advising that fire is located in Ms. Childers' class in Zone 1. Fire in Zone 1."
Responder 36:
"Roger that. Unit seven heading to Coral Reef Elementary School, Zone 1."

By way of further example, reference is made to FIGS. 3A-3B which represent additional, dynamic display aspects of system displays 40, 41 associated with the zone scheme of FIGS. 2A-2D. As seen in FIG. 3A, a particular color code 46 is enabled for "zone 1" to convey additional information relative to the other zones 45. For example, the status of a particular zone 45 might be emphasized relative to the others by such use of the color codes 46. As depicted, the color codes of the other three zones are not active. Accordingly, in one scenario, such a scheme might indicate that "zone 1" should be avoided while all other zones are still safe to occupy. In the embodiment of FIG. 3B, color codes 46 are activated for three of the four zones 45. It is, of course, within the scope and intent of the present invention that other combinations of color codes 46 and/or number displays 43 can be activated in a similar manner to convey appropriate information.

Furthermore, with additional reference to the dynamic display aspects of FIGS. 3A-3B, hardcopy system displays 40 can be posted and updated manually, such as when a posted display 40 is printed accordingly in real time, or selected from a stack of pre-printed displays 40, etc. In the case of electronic system displays 40, 41, the presentation of a particular display can simply be electronically updated in real time as circumstances dictate. Moreover, as also represented in FIGS. 3A-3B, additional information can be conveyed by the system displays 40, 41, via use of symbols, text, graphics, etc. As depicted in FIGS. 3A-3B, two such examples include a zone status summary field 48 and a premises identifier field 48'. As one basic example, the zone status summary field 48 of FIG. 3A indicates the active status of "zone 1." Likewise, the zone status summary field 48 of FIG. 3B indicates the active status of "zone 1," "zone 2," and "zone 3." It is further contemplated that a variety of other information can also be conveyed by the zone status summary field 48. As also depicted, the premises field 48' indicates the name of the particular premises 20 at issue, such a business name, although in other embodiments, the premises identifier field 48' can indicate the name of a hospital, school campus, individual home, neighborhood, etc., as appropriate.

In view of the foregoing examples, it should be noted that it is within the scope and intent of the present invention that any number, size, shape and/or color of zones 45 and microzones 49, 49', as well as a variety of symbols associated therewith, may be utilized to achieve a desired correlation with location indicators and to convey other appropriate information associated with a given zone scheme.

Accordingly, with reference to FIGS. 4A-4C, various "microzones" 49, 49' are depicted which function as zones 49, 49' within other zones 45. As schematically shown in FIGS. 4A-4B, the microzones 49 are represented by letter displays 50 ("A" through "D"). With further reference to the example of FIG. 4B, microzone "A" pertains to a main office area; whereas microzone "C" represents a cafeteria area. In this manner, orderly reference to microzones 49, 49' can be made in emergency response efforts, such as "zone 1A" to indicate microzone "A" in "zone 1."

While FIG. 4B schematically represents a publicly accessible system display 40, 41, FIG. 4C depicts an embodiment of a more selectively accessible display, such as that available to law enforcement but not to the general public. For instance, by electronically accessing the publicly available data in connection with an emergency response scenario, law enforcement or other select responders can set up customized, selectively accessible system displays 41' for their own internal communication and response purposes. As shown in FIG. 4C, microzones 49, 49' can accordingly be referenced in connection with efforts to isolate and contain a threat, such as in this example an office lounge of "zone 1, microzone A, submicrozone A" (with shorthand reference "01:A:A") and/or a principal's office of "zone 1, microzone A, submicrozone D" (with shorthand reference "01:A:D").

Figure 4D:
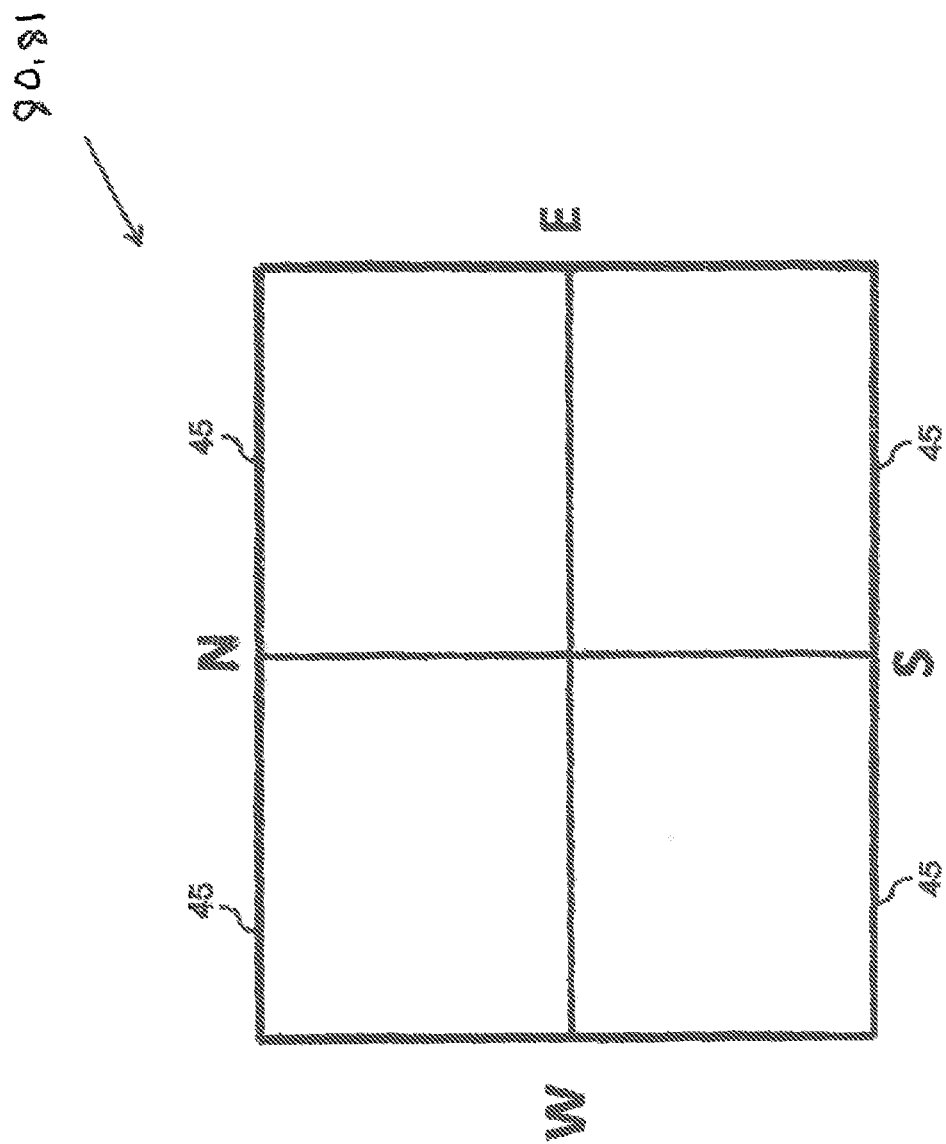
FIG. 4D is a schematic representation of structural and operative features of another zone scheme utilized by first responders to interact with the system of FIG. 1B.

While FIG. 4B schematically represents a publicly accessible system display 40, 41 and FIG. 4C depicts an embodiment of a more selectively accessible system displays 41', FIG. 4D depicts an embodiment of a triage system display 80, 81 of a premises 20 that can represent either. FIG. 4D is a schematic illustration of a zone scheme typically utilized by first responders to interact with the system 10 of FIG. 1B as depicted. The physical embodiment of the triage system displays 80, 81 can take the form of traditional hardcopy, such as signs, posters, maps, etc., as well as modern electronic displays, such as electronic billboards, computer screens, mobile communication device displays, etc. An emergency dispatcher 35, or electronic equivalent 33, can reference the designated location zones 45 to relay important location information of assessed triage levels regarding a designated triage area of premises 20 to first responders 36, regardless of whether additional premises-related information is immediately available.

In some embodiments, first responders 36 may have the ability to identify emergency victim information and communicate with a zone server 30, dispatch system 33 and/or dispatcher 35, via responder interfaces 34 communicably connected to network 27, in order to relay such information about the emergency. In at least some embodiments, responder interfaces 34 are structured for receiving input from first responders 36 to update emergency victim information to zone server 30, which can be communicably connected with a dispatch system 33 and/or dispatcher 35 to further facilitate the interactive emergency response capabilities of the system 10.

In the embodiment of FIG. 4D, the layout of a triage area of a premises 20 is represented for example, by four zones 45. The preferred arrangement for the zones 45 involves implementation of a quadrant scheme, wherein each of the triage system displays 80, 81 is divided into four quadrants where each quadrant is generally tied to a direction of the corresponding designated triage area of the premises 20, such that the four primary zones 45 are disposed in an orientation in relation to a particular corresponding area of the designated triage area of the premises 20. For instance, in one embodiment, a four quadrant scheme can comprise a first quadrant that represents a Northwest portion of the triage area of the premises 20, a second quadrant that represents a Northeast portion of the triage area of the premises 20, a third quadrant that represents a Southeast portion of the triage area of the premises 20, and a fourth quadrant that represents a Southwest portion of the triage area of the premises 20. While this is not the only appropriate manner in which to organize/arrange the various zones 45, it is shown as a preferred embodiment that can be implemented in a relatively straightforward manner to carry out the objectives of the present invention.

Further, each of the primary zones 45 can represent a particular assessed triage level. For instance, a first zone can represent "Minor Injuries," a second zone can represent "Deceased," a third zone can represent "Immediate Medical Attention," and a fourth zone can represent "Delayed." In addition, the zones 45 can be displayed in a superimposed manner relative to mapped features of the premises 20, such as satellite photos, site maps, architectural plans, etc.

Furthermore, triage system display 80 can be posted as a hardcopy and updated manually, such as when a posted display 80 is printed accordingly in real time, or selected from a stack of pre-printed displays 80, etc. In the case of electronic triage system displays 80, 81, the presentation of a particular display can simply be electronically updated in real time, via network 27, as circumstances dictate. Moreover, additional information can be conveyed by the triage system displays 80, 81, via use of symbols, text, graphics, etc.

In view of the foregoing examples, it is also is within the scope and intent of the present invention that the aforementioned system displays 40, 41, 41' and related system 10 features could be integrated with a variety of existing databases and information technologies, including, but not limited to GOOGLE maps, MICROSOFT MAPS, APPLE maps, SKYPE, GPS, Department of Defense databases, local police and/or fire department databases, existing emergency dispatch systems 33, etc. Furthermore, various aspects of the system 10 could be integrated with premises monitoring systems, security systems, and the like, such as ADT systems, DEVCON systems, BRINKS systems, VIVINT systems, etc.

Turning now to additional interactive multimedia features of the system 10, at least some of which could interact, integrate, or otherwise interface with the aforementioned technologies of the preceding paragraph, FIGS. 5A-5B depict examples of mapping overlay display features 51 associated with the respective zone schemes. For instance, FIG. 5 depicts a satellite image overlay 51 of a school campus which corresponds to four designated zones 45 ("zones 1-4"). In this way, the mapping overlay display features 51 permit display of zones 45 and zone-related information in a superimposed manner relative to mapped features of the local premises, such as satellite photos, street maps, site maps, architectural plans, etc., for the general area, specific premises 20, and/or particular area within the premises 20. In some embodiments, this display can be dynamically adjusted, in relatively short order, if not immediately in real time (or upon request).

Another useful feature of the system 10 is depicted in FIG. 6 which presents an example of threat level indicators 55 corresponding to respective zones 45. The users, such as first responders 36, dispatchers 35, or automated aspects of the dispatch system 33 can evaluate pertinent conditions and appropriately determine a corresponding threat level associated with a given zone 45. Once a threat level is determined, the threat level can be displayed via the corresponding threat level indicator 55. By way of example, threat level indicators 55 can assume the relative presentations of a heat index, such that "warm zones" are identified with moderate hazards, "hot zones" are identified with imminent threats, etc. Furthermore, a threat containment line 56 can also be calculated and displayed based on pertinent conditions. In the example shown, the threat containment line 56 is displayed in a manner that separates the "hot zone" in "zone 1" from the "warm zone" areas of "zones 2-4." Further still, the system 10 is capable of assigning and displaying relative threat level indicators 55 in dynamic fashion as the situation develops, such as in real time. Likewise, the system 10 is capable of adjusting the position and other parameters of the threat containment line 56 in real time, as circumstances dictate.

Figure 7:
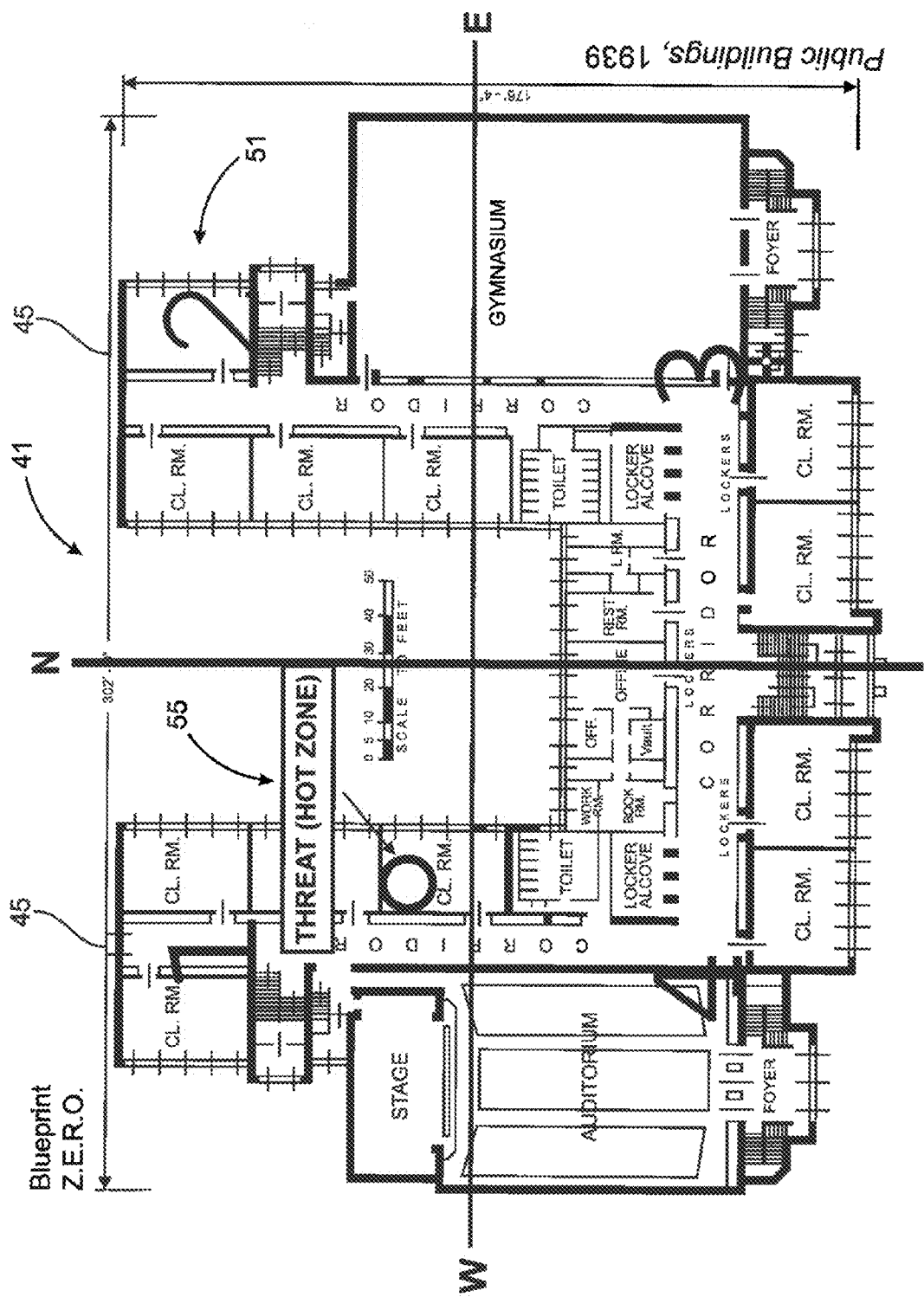
FIG. 7 depicts another example of a threat level indicator associated with a particular zone and a particular microzone, together with architectural plan overlay features.

By way of further example, FIG. 7 depicts another instance of a threat level indicator 55 associated with a particular zone 45, together with architectural plan or "blueprint" image overlay 51 features. In the foregoing scenarios, the dispatcher 35 could direct first responders 36 towards the direction of the threat (hot zone), while bystanders 25 can take measures to move away from the threat (hot zone).

Figure 8:
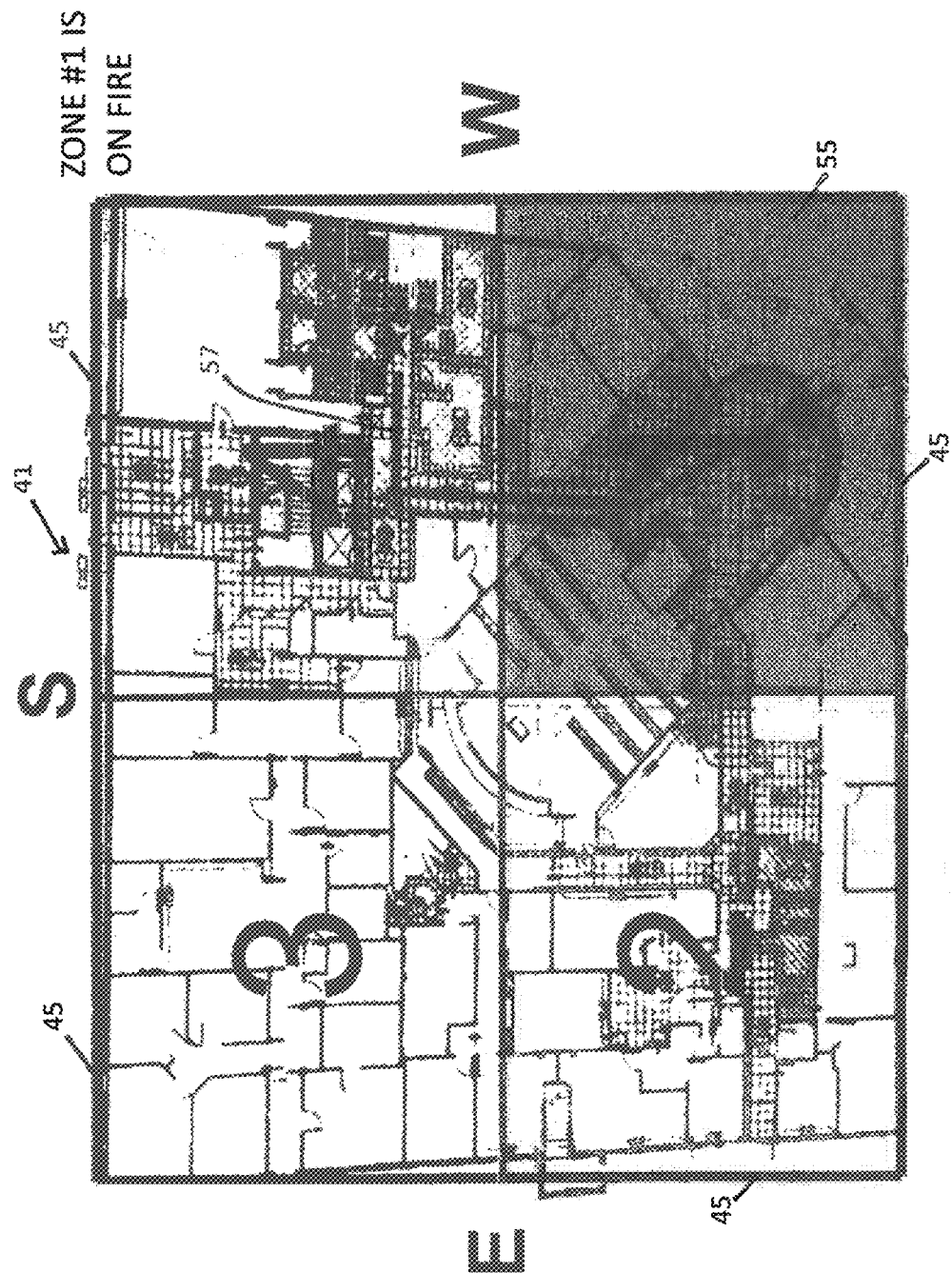
FIG. 8 depicts an example of a threat level indicator associated with a zone and microzone containing a portion of a default evacuation route.

As yet another example, FIG. 8 depicts an example of a threat level indicator associated with a zone 45 which contains a portion of a default evacuation route 57. Generally, pre-designated evacuation routes 57 are typically designed to provide the safest path of escape; however, such routes 57 by their nature tend to limit evacuees 25 to one single path of travel. Thus, in cases of extreme emergency, such as when the pre-established evacuation route 57 becomes blocked, destroyed, or otherwise dangerous to follow, the system 10 of the present invention can provide evacuees 25 with alternative pathways and/or warnings to not enter a hazardous zone. As one example of a warning, a threat level indicator 55 can be implemented to alert evacuees 25 to avoid entering the pre-established evacuation route 57 (in this case represented a shading of the zone 45, "zone 1") and to seek alternatives.

In accordance with the above-described system 10, the present invention also contemplates methods of utilizing the innovative system 10 accordingly. By way of example, FIG. 9 depicts a schematic representation of at least a portion of a corresponding method 100 associated with use of the system 10 of FIG. 1 and the zone scheme(s) of FIGS. 2A through 8.

Figure 9:
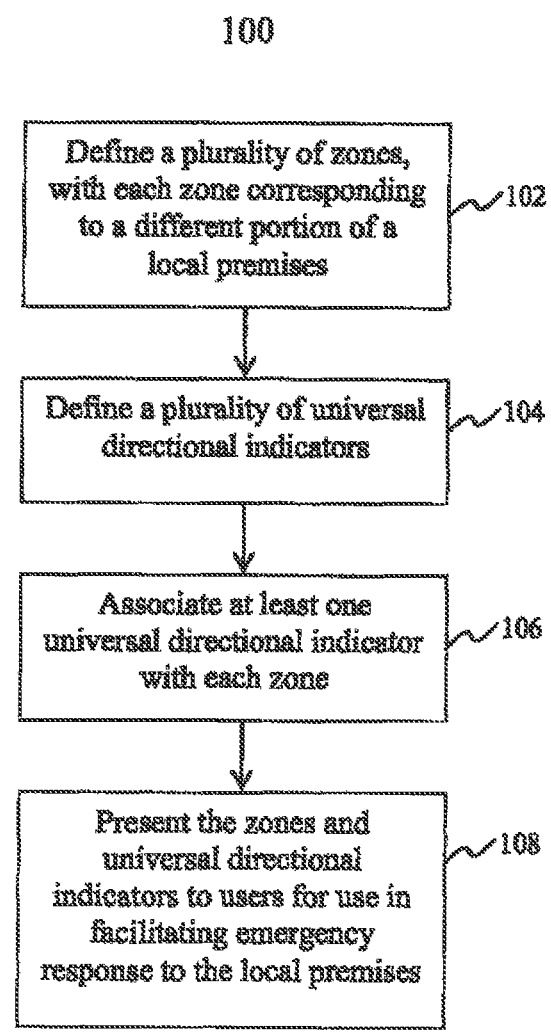
FIG. 9 is a schematic representation of at least a portion of the method of the present invention associated with the system of FIG. 1, and zone and microzone scheme(s) of FIGS. 2A through 8.
Figure 10:
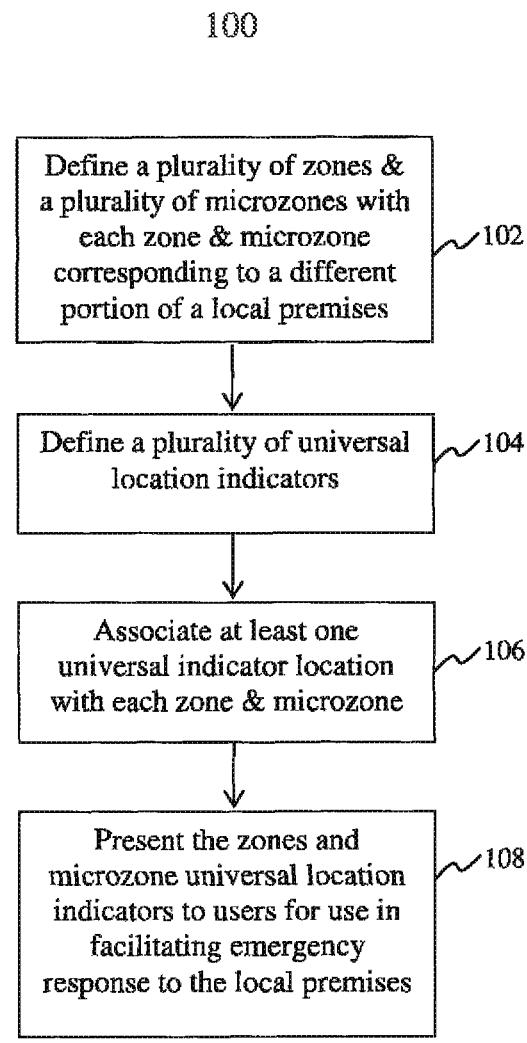
FIG. 10 is a schematic representation of at least a portion of the method of the present invention associated with the system of FIG. 1A, and zone and microzone scheme(s) of FIGS. 2A through 8.

With primary reference now to FIG. 9, the method 100 associated with the system 10 begins at Block 102 wherein the plurality of zones 45 is defined, with each zone typically corresponding to a different portion of the local premises 20.

Next, the above-described universal location indicators 47 are defined, as at Block 104. Once defined, the universal location indicators 47 are appropriately associated with corresponding zones 45 (Block 106), such as in the various zone schemes described, above.

Accordingly, the designated location zones 45 and the universal location indicators 47 are then presented to users, as at Block 108, for use in facilitating an emergency response to the local premises 20. For example, an emergency dispatcher 35, or electronic equivalent, can reference the designated location zones 45 to relay important location information regarding a target location to first responders 36, regardless of whether additional premises-related information is immediately available. As another example, a bystander 25 can use such information to relay important location information to a dispatcher 35.

As noted above, additional features can be incorporated into the presentation of zones 45, including the aforementioned "microzones" 49, 49', mapping overlay display features 51, threat level indicators 55, etc.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

Now that the invention has been described,

What is claimed is:

1. A system for facilitating emergency response to a premises, said system comprising:
    at least one premises system display structured to present a plurality of premises zones;
    each of said plurality of premises zones fixedly corresponding to a true direction of the premises, said plurality of premises zones collectively configured to convey at least directional information pertaining to the premises; and
    at least one triage system display structured to present a plurality of triage zones.

2. A system as recited in claim 1 wherein said plurality of premises zones are collectively disposed in a clockwise orientation in relation to a particular corresponding direction about the premises.

3. A system as recited in claim 2 wherein said plurality of premises zones are collectively arranged to represent four quadrants of the premises.

4. A system as recited in claim 3 wherein a first zone represents a Northwest portion of the premises, a consecutive second zone represents a Northeast portion of the premises, a consecutive third zone represents a Southeast portion of the premises, and consecutive fourth zone represents a Southwest portion of the premises.

5. A system as recited in claim 1 further structured to present a plurality of premises microzones corresponding to specified areas of the premises within a designated zone.

6. A system as recited in claim 5 wherein said plurality of premises microzones are arranged to represent four quadrants within a corresponding one of said plurality of designated zones.

7. A system as recited in claim 1 wherein said premises system display is further structured to depict at least a portion of the premises via a premises mapping overlay display.

8. A system as recited in claim 7 wherein said premises mapping overlay display is selected from the group consisting of: satellite image, street map, site map, architectural plans, or GPS coordinates.

9. A system as recited in claim 1 wherein each of said plurality of triage zones represent a particular assessed triage level.

10. A system for facilitating emergency response to a premises, said system comprising:
    at least one triage system display structured to present a plurality of triage zones;
    each of said plurality of triage zones corresponding to a different area of the premises, said plurality of triage zones collectively configured to convey at least location information pertaining to the premises;
    each of said plurality of triage zones representing a particular assessed triage level; and
    at least one premises system display structured to present a plurality of premises zones.

11. A system as recited in claim 10 wherein said plurality of triage zones are collectively disposed in a clockwise orientation in relation to a particular corresponding direction about the premises.

12. A system as recited in claim 11 wherein said plurality of triage zones are arranged to represent four quadrants of the premises.

13. A system as recited in claim 12 wherein said plurality of triage zones comprise a first zone represents a Northwest portion of the premises, a second zone represents a Northeast portion of the premises, a third zone represents a Southeast portion of the premises, and a fourth zone represents a Southwest portion of the premises.

14. A system as recited in claim 10 wherein said triage system display is further structured to depict at least a portion of the premises via triage mapping overlay display.

15. A system as recited in claim 14 wherein said triage mapping overlay display is selected from the group consisting of: satellite image, street map, site map, architectural plans, or GPS coordinates.

16. A system as recited in claim 10 further structured to present triage zone related information via triage symbolic display, wherein said triage symbolic display is selected from the group consisting of: numbers, letter of alphabets, symbols, patterns, graphics, text, or color codes.

17. A system for facilitating emergency response to a premises, said system comprising:
- at least one premises system display structured to present a plurality of premises zones;
- each of said plurality of premises zones fixedly corresponding to a true direction of the premises, said plurality of premises zones collectively configured to convey at least directional information pertaining to the premises;
- at least one triage system display structured to present four triage zones, said four triage zones arranged to represent four quadrants of the premises;
- each of said four triage zones corresponding to a different area of the premises, said four triage zones collectively configured to convey at least location information pertaining to the premises; and
- each of said four triage zones represents a particular assessed triage level.

\* \* \* \* \*